United States Patent
Skrjanc et al.

(10) Patent No.: US 11,499,593 B2
(45) Date of Patent: Nov. 15, 2022

(54) TOOL-LESS CLUTCH ADJUSTMENT AND REMOVAL FOR DRAIN CLEANER

(71) Applicant: Ridge Tool Company, Elyria, OH (US)

(72) Inventors: Robert Skrjanc, Lorain, OH (US); Glen R. Chartier, Avon Lake, OH (US); Scott Kruepke, North Royalton, OH (US); James E. Hamm, Grafton, OH (US); Harald Krondorfer, Aurora, OH (US)

(73) Assignee: Ridge Tool Company, Elyria, OH (US)

( * ) Notice: Subject to any disclaimer, the term of this patent is extended or adjusted under 35 U.S.C. 154(b) by 537 days.

(21) Appl. No.: 16/214,325

(22) Filed: Dec. 10, 2018

(65) Prior Publication Data
US 2019/0186551 A1    Jun. 20, 2019

Related U.S. Application Data

(60) Provisional application No. 62/598,520, filed on Dec. 14, 2017.

(51) Int. Cl.
| | |
|---|---|
| *F16D 13/10* | (2006.01) |
| *F16D 13/62* | (2006.01) |
| *F16D 23/12* | (2006.01) |
| *F16D 13/75* | (2006.01) |
| *F16H 1/16* | (2006.01) |
| *B08B 9/04* | (2006.01) |
| *F16H 19/04* | (2006.01) |
| *B08B 9/045* | (2006.01) |

(52) U.S. Cl.
CPC ............... *F16D 13/10* (2013.01); *B08B 9/04* (2013.01); *F16D 13/62* (2013.01); *F16D 13/75* (2013.01); *F16D 23/12* (2013.01); *F16H 1/16* (2013.01); *F16H 19/04* (2013.01); *B08B 9/045* (2013.01); *F16D 2023/123* (2013.01)

(58) Field of Classification Search
CPC ................................. F16D 13/62; F16D 13/10
See application file for complete search history.

(56) References Cited

U.S. PATENT DOCUMENTS

| | | | | |
|---|---|---|---|---|
| 4,447,926 A | * | 5/1984 | Rothenberger | E03F 9/005 15/104.33 |
| 5,414,888 A | * | 5/1995 | Irwin | E03F 9/005 15/104.33 |
| 5,657,505 A | * | 8/1997 | Gallagher | E03F 9/005 15/104.33 |
| 6,076,216 A | * | 6/2000 | Biryukov | B03C 3/00 134/1 |
| 9,482,254 B2 | * | 11/2016 | Lai | F16B 7/1418 |
| 10,051,930 B2 | * | 8/2018 | Heim | A63C 11/221 |

(Continued)

OTHER PUBLICATIONS

Operator's Manual for K-60SP (52 pages, 2004): Earliest identified publication Jun. 2003.

(Continued)

*Primary Examiner* — Timothy Hannon
(74) *Attorney, Agent, or Firm* — Mark E. Bandy; Rankin Hill & Clark, LLP

(57) ABSTRACT

Various clutch adjusting assemblies for incorporating in drain cleaning machines are described. The assemblies enable adjustment or setting of a clutch in a drain cleaning machine without the use of tools.

7 Claims, 24 Drawing Sheets

(56) References Cited

U.S. PATENT DOCUMENTS

2017/0108760 A1* 4/2017 Achenbach ........ F16M 11/2014
2018/0030715 A1* 2/2018 Miller ..................... B08B 9/045

OTHER PUBLICATIONS

Parts List for K-60SP (2 pages, 2008).
Operator's Manual for K-75A/B, K-1500A/B, K-1500SP (52 pages, 2005): Earliest identified publication Jun. 1992.
Parts List for K-75A, K-75B, K-1500A, K-1500B, K-1500ASP, K-1500BSP (5 pages): Earliest identified publication Jun. 7, 2010.

* cited by examiner

TOOL-LESS CLUTCH ADJUSTMENT AND REMOVAL FOR DRAIN CLEANER

CROSS REFERENCES TO RELATED APPLICATIONS

This application claims priority from U.S. provisional application Ser. No. 62/598,520 filed on Dec. 14, 2017.

FIELD

The present subject matter relates to drain cleaning machines and particularly such machines using adjustable clutches for accommodating drain cleaning cables having different diameters.

BACKGROUND

Many drain cleaning machines are designed to accommodate drain cleaning cables of different sizes, i.e., diameters. Use of different cable sizes enables a greater range of drain pipe sizes that can be cleaned. In addition, in many applications a user may select one of a variety of different cable diameters that could potentially be used. For example, selection of a smaller cable diameter provides a lighter and more flexible cable option to the user during operation as compared to a larger cable diameter. And selection of a larger cable diameter provides a more robust cable option for clearing difficult blockage, as compared to a smaller cable diameter.

Drain cleaning cables are axially rotated by the drain cleaning machine to clear blockages in drain lines and/or to aid the cable in moving within the drain line such as during cable extension. In order to rotate the cable, a clutch of the drain cleaning machine must be "set" to allow the clutch jaws to sufficiently engage the cable when the actuating mechanism is activated. Adjusting or setting the clutch of such drain cleaning machines requires various tools for example one or more wrenches or similar tools. Since most drain cleaning operations are performed at a job site or in an area remote from a user's tools, the tools required for clutch adjustment must be brought by the user to the drain cleaning machine. This further increases the demands on the user and increases the potential for loss or misplacement of the tools.

Accordingly, in view of these and other concerns, a need exists for a strategy and assembly by which a clutch of a drain cleaning machine can be adjusted to accommodate different cable sizes without tools. Such a strategy and assembly would significantly increase the operating efficiency of the user and provide greater convenience during use of the drain cleaning machine. Further, as the clutch expectedly wears from use, the clutch position could likewise be adjusted by the user quickly and without the use of tools to maintain the most ergonomic or convenient operating setting.

SUMMARY

The difficulties and drawbacks associated with previous approaches are addressed in the present subject matter as follows.

In one aspect, the present subject matter provides an adjustable clutch assembly comprising a plurality of positionable clutch members. Each clutch member defines an engagement face and at least one ramp region. The clutch assembly also comprises at least one movable clutch cone defining a cone face. The clutch assembly also comprises an adjustment shaft defining a proximal end, a distal end, a hollow interior extending between the proximal end and the distal end, and a longitudinal axis. The adjustment shaft also defines a threaded engagement region, wherein upon rotation of the adjustment shaft, the adjustment shaft is linearly displaced relative to the plurality of clutch members. The clutch assembly additionally comprises a locking clamp positionable between a free position in which the adjustment shaft can be rotated by a user to effect linear displacement of the shaft and a locked position in which the adjustment shaft can not be rotated by a user to effect linear displacement of the shaft.

In another aspect, the present subject matter provides an adjustable clutch assembly comprising a plurality of positionable clutch members. Each clutch member defines an engagement face and at least one ramp region. The clutch assembly also comprises at least one movable clutch cone defining a cone face. The clutch assembly also comprises an adjustment shaft defining a proximal end, a distal end, a hollow interior extending between the proximal end and the distal end, and a longitudinal axis. The adjustment shaft also defines at least one aperture accessible along a circumferential region between the proximal end and the distal end. The clutch assembly also comprises a sleeve disposed about the adjustment shaft. The sleeve defines at least one arcuate cam slot. The clutch assembly also comprises a lever sized and shaped to be inserted in the arcuate cam slot of the sleeve and the aperture of the adjustment shaft. Upon (i) insertion of the lever in both the arcuate cam slot of the sleeve and the aperture of the adjustment shaft, and (ii) displacement of the lever within the arcuate cam slot, the adjustment shaft is linearly displaced relative to the plurality of clutch members.

In another aspect, the present subject matter provides an adjustable clutch assembly comprising a plurality of positionable clutch members. Each clutch member defines an engagement face and at least one ramp region. The clutch assembly also comprises at least one movable clutch cone defining a cone face. The clutch assembly also comprises at least one stationary sloped component defining a distal sloped face. The clutch assembly also comprises an adjustment shaft and a sloping cam component integral with each other. The sloping cam component defines at least one guide slot extending arcuately around the adjustment shaft. The clutch assembly also comprises at least one fastener extending through the guide slot and adapted to selectively engage a corresponding stationary sloped component. Upon loosening of the at least one fastener from the corresponding stationary sloped component, the integral adjustment shaft and sloping cam component can be rotated about a longitudinal axis of the adjustment shaft which thereby results in axial displacement of the adjustment shaft relative to the at least one stationary sloped component.

In still another aspect, the present subject matter provides an adjustable clutch assembly comprising a plurality of positionable clutch members. Each clutch member defines an engagement face and at least one ramp region. The clutch assembly also comprises at least one movable clutch cone defining a cone face. The clutch assembly also comprises at least one stationary boss defining a distal flat face. The clutch assembly also comprises an adjustment shaft and a cam component integral with each other. The cam component defines at least one guide slot extending arcuately around the adjustment shaft, and the cam component including a plurality of steps adjacent the guide slot. The clutch assembly also comprises at least one fastener extending through the guide slot and adapted to selectively engage a corresponding stationary boss. Upon loosening of the at least one fastener from the corresponding stationary boss, the integral adjustment shaft and cam component can be rotated about a longitudinal axis of the adjustment shaft which thereby results in axial displacement of the adjustment shaft relative to the at least one stationary boss.

In yet another aspect, the present subject matter provides an adjustable clutch assembly comprising a plurality of positionable clutch members. Each clutch member defines an engagement face and at least one ramp region. The clutch assembly also comprises at least one movable clutch cone defining a cone face. The clutch assembly also comprises an adjustment shaft defining a proximal end, a distal end, a hollow interior extending between the proximal end and the distal end, and a longitudinal axis. The clutch assembly also comprises a linear gear rack affixed to the adjustment shaft. The clutch assembly also comprises a rotatable pinion shaft including (i) a gear region engaged with the linear gear rack and (ii) a worm wheel. The clutch assembly additionally comprises a clutch adjustment member having a worm gear. And, the clutch assembly comprises a clutch actuation handle having a passage sized and shaped to receive the pinion shaft, and having a receptacle adapted to receive the clutch adjustment member. Upon rotation of the worm gear of the clutch adjustment member; the pinion shaft is rotated, thereby causing linear displacement of the adjustment shaft.

In yet another aspect, the present subject matter provides an adjustable clutch assembly comprising a plurality of positionable clutch members. Each clutch member defines an engagement face and at least one ramp region. The clutch assembly also comprises at least one movable clutch cone defining a cone face. The clutch assembly also comprises an adjustment shaft defining a proximal end, a distal end, a hollow interior extending between the proximal end and the distal end, and a longitudinal axis. The clutch assembly also comprises a linear gear rack affixed to the adjustment shaft. The clutch assembly also comprises a rotatable pinion shaft including a gear region engaged with the linear gear rack. And, the clutch assembly comprises a clutch actuation handle having a passage sized and shaped to receive the pinion shaft, and having a receptacle adapted to receive the clutch adjustment member. The pinion shaft is selectively displaceable between (i) a free position in which rotation of the pinion shaft is independent of the handle and (ii) an engaged position in which rotation of the pinion shaft is dependent upon the handle.

In still another aspect, the present subject matter provides an adjustable clutch assembly comprising a plurality of positionable clutch members. Each clutch member defines an engagement face and at least one ramp region. The clutch assembly also comprises at least one movable clutch cone defining a cone face. The clutch assembly also comprises an adjustment shaft defining a proximal end, a distal end, a hollow interior extending between the proximal end and the distal end, and a longitudinal axis. The clutch assembly also comprises a linear gear rack affixed to the adjustment shaft. The clutch assembly also comprises a rotatable pinion shaft including a gear region engaged with the linear gear rack. The clutch assembly additionally comprises a clutch actuation handle engaged with the pinion shaft such that displacement of the handle causes rotation of the pinion shaft, and corresponding movement of the linear gear rack and the adjustment shaft. The clutch assembly also comprises a selectively positionable locking pin assembly positionable between a locked position in which the clutch actuation handle can be displaced, and an unlocked position in which the clutch actuation handle can not be displaced.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

The present subject matter relates to sectional drain cleaning equipment that utilizes a clutch mechanism to contact and engage a drain cleaning cable to transmit rotation from the equipment to the cable for the purpose of feeding or retrieving the cable, or for clearing a drain blockage, when initiated or desired by an operator.

The present subject matter could further relate to any application in which a clutch is selectively engaged onto a device or component to be rotated and the starting position of the clutch must be set, or preset, based on the free state of the component to be engaged.

Similarly, the present subject matter also relates to applications in which the clutch may wear and the starting position of the clutch surface relative to the component to be engaged, should be adjusted to maintain consistency in operation of the clutch and equipment.

And, the present subject matter relates to applications in which the clutch is removed for service or replacement. Specifically, if the clutch needs to be removed for service or replacement, the present subject matter provides a tool-free, efficient means to remove the clutch by utilizing the normal operating range of motion of the actuating mechanism and additional provided travel within the clutch system.

In accordance with an embodiment of the present subject matter, in order to achieve clutch adjustment in a drain cleaning machine for different drain cable sizes or to account for material wear in the clutch system, a locking assembly is provided having an over-center lever that is pivoted, rotated, or otherwise moved to release circumferential pressure from a locking clamp. When the clamping pressure is released, a threaded adjustment shaft can be freely and manually rotated by a user. As the shaft is rotated in one direction, the entire shaft moves towards the clutch assembly through thread screwing action, compressing the clutch jaws inward via contact with corresponding clutch cone surfaces and spring force to accommodate a smaller diameter, such as would be desired for a smaller drain cleaning cable, or to compensate for material wear. When the adjustment shaft is rotated in the opposite direction by the user, the clutch jaws move outward to accommodate a larger diameter, such as would be desired for a larger drain cleaning cable.

Figure 1:
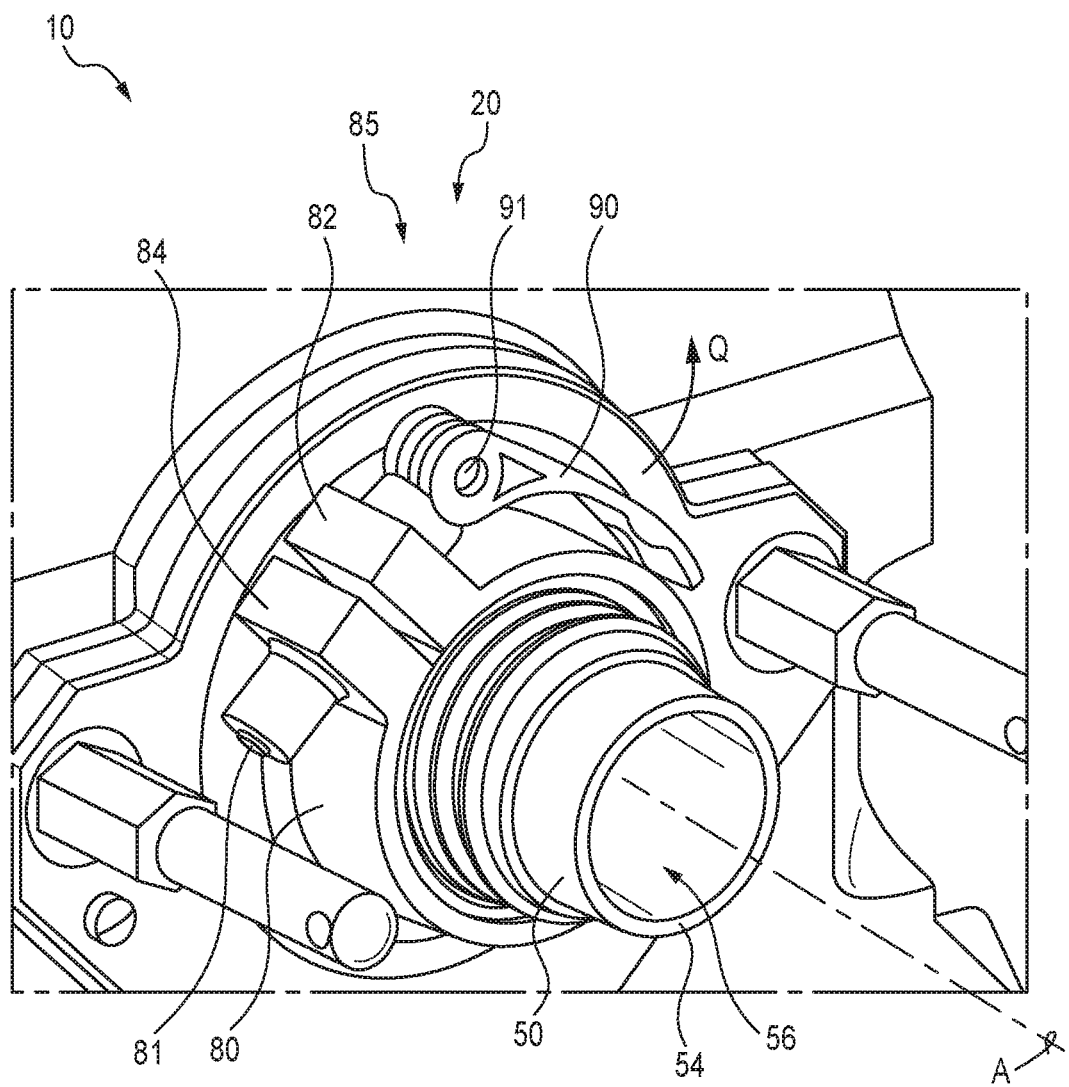
FIG. 1 is a schematic partial perspective view of a portion of a drain cleaning machine utilizing an embodiment of an assembly for tool-less clutch adjustment in accordance with the present subject matter.
Figure 2:
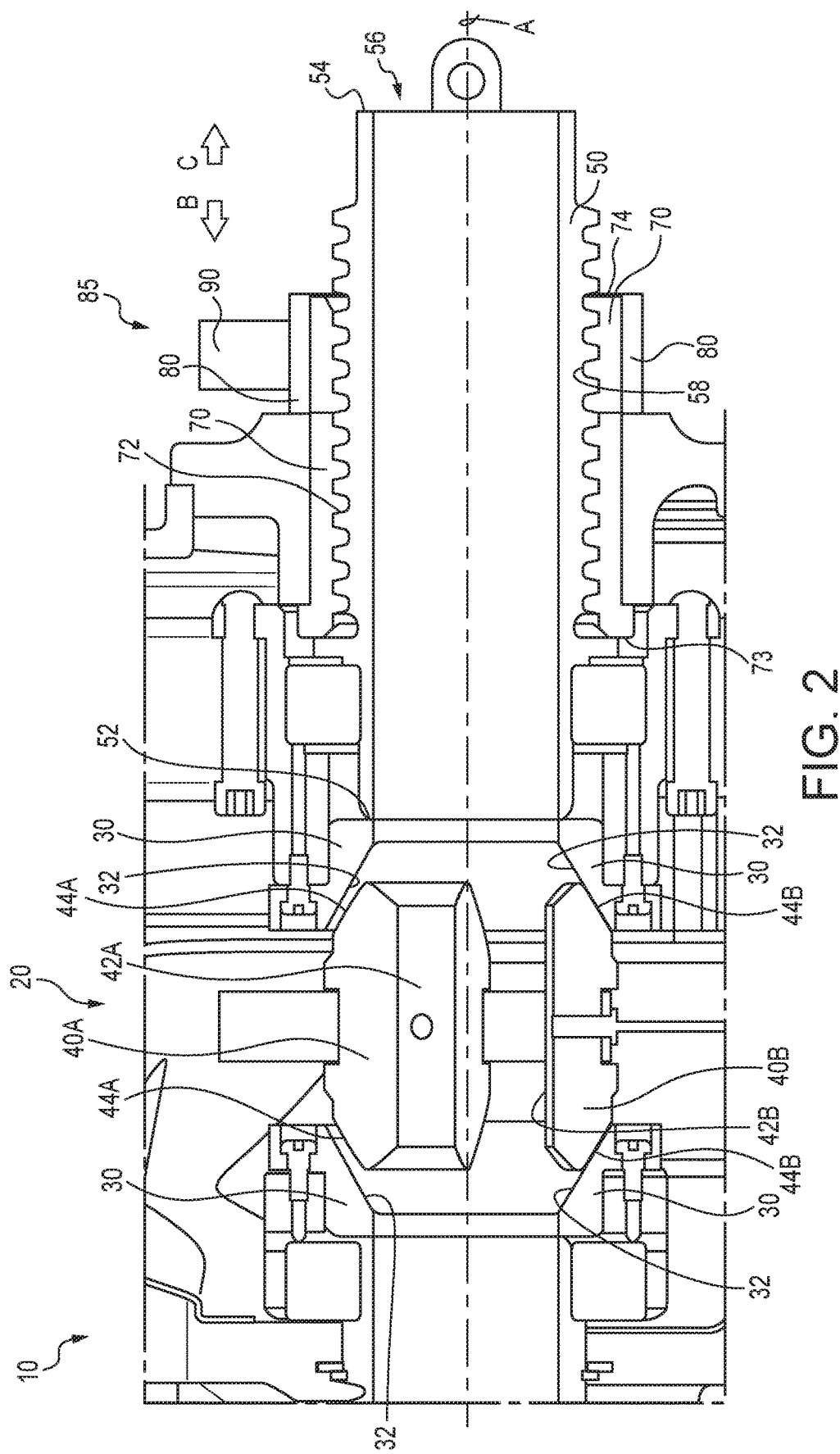
FIG. 2 is a schematic partial cross sectional view of the assembly of FIG. 1.

Specifically, referring to FIGS. 1 and 2, a portion of a drain cleaning machine 10 is depicted having an adjustable clutch assembly 20 in accordance with an embodiment of the present subject matter. The clutch assembly 20 comprises a plurality of positionable clutch members 40 such as members 40A and 40B. Each clutch member defines an engagement face 42 such as face 42A and 42B for contacting a drain cleaning cable (not shown) and one or more ramp regions 44 such as regions 44A and 44B. These aspects are described in greater detail herein. Typically, the number of clutch members 40 associated with the clutch assembly 20 is within a range of from 2 to 10 with a preferred total number of positionable clutch members 40 being three (3). However, it will be understood that the present subject matter includes a wide array of clutch assemblies 20 having different types and numbers of clutch members 40. In the embodiment depicted in FIGS. 1 and 2, each clutch member, e.g., 40A and 40B, is radially positionable relative to a longitudinal axis A which is depicted in FIGS. 1 and 2, and described in greater detail herein with another component of the clutch assembly, an adjustment shaft 50.

The adjustment shaft 50 is typically in the form of a longitudinal cylindrical member defining a proximal end 52, an opposite distal end 54, and a hollow interior 56 extending between the ends 52, 54. The adjustment shaft 50 also includes a threaded engagement region 58 typically along its external circumferential outer face and at least partially between the ends 52, 54. The adjustment shaft 50 is threadedly engaged with a threaded region 72 of a base sleeve 70, typically affixed or otherwise incorporated in the drain cleaning machine 10. As will be understood, rotation of the adjustment shaft 50 about axis A results in linear displacement of the adjustment shaft in either of the directions of arrows B or C.

The clutch assembly 20 also comprises one or more clutch cones 30, each having a cone face 32. At least a portion of the clutch cones 30 are affixed or engageable with the adjustment shaft 50 such that linear displacement of the shaft 50 in the direction of arrow B results in linear displacement of the clutch cones 30 toward the clutch members 40. In certain versions of the clutch assembly 20, the clutch cones 30 on one side of the clutch members 40 move toward the clutch cones 30 on an opposite side of the clutch members 40, and vice-versa. That is, referring to FIG. 2, the clutch cones 30 on the left side of the clutch members 40 move toward the clutch members 40 in the direction of arrow C, and the clutch cones 30 on the right side of the clutch members 40 move toward the clutch members 40 in the direction of arrow B.

The clutch cones 30 define one or more cone faces 32 that are directed toward corresponding ramp regions 44 of the clutch members 40. Upon displacement of the clutch cones 30 toward the clutch members 40, the cone faces 32 contact corresponding ramp regions 44 of the clutch members 40 and with continued linear displacement of the adjustment shaft 50 in the direction of arrow B, the clutch members 40 are positioned or moved radially inward toward longitudinal axis A. The clutch members 40 can be moved radially inward until they contact and frictionally engage a drain cleaning cable disposed in the hollow interior 56 of the adjustment shaft 50.

The clutch assembly 20 also comprises a locking assembly such as including a locking clamp 85 which is positionable between a free position in which the adjustment shaft 50 can be manually rotated by a user, typically without tools, to effect linear displacement of the shaft 50; and a locked position in which the adjustment shaft 50 can not be manually rotated by a user. In many applications, a typical user can manually rotate the adjustment shaft if the shaft can be rotated using a torque force of less than about 15 in-lb. If a torque force of about 50 in-lb. or more is required to rotate the adjustment shaft, then the shaft is not manually rotatable as described herein. Typically, in the locked position, the locking clamp 85 frictionally engages the adjustment shaft 50 in a desired position. In the embodiment depicted in FIGS. 1 and 2, the locking clamp 85 is in the form of a circumferential member 80 surrounding the periphery of the base sleeve 70 and the adjustment shaft 50 threadedly engaged therewith. The locking clamp 85 in many versions also includes an over-center lever 90 engageable with a first end 82 and a second end 84 of the circumferential member 80 via a member 81. As will be understood, upon selective positioning of the lever 90, the locking assembly, which in the version shown in the referenced figures is in the form of a locking clamp 85, can be positioned between the noted free position and the noted locked position. Thus, upon positioning the lever 90 to the locked position such as depicted in FIG. 1, the locking clamp 85 urges the first end 82 and the second end 84 toward each other, thereby increasing the force applied to the adjustment shaft 50 and frictionally engaging the shaft 50 in a desired linear or axial position. As will be understood, the lever 90 is positionable or rotatable about an axle 91. The lever 90 can be positioned to the unlocked position by moving the lever 90 about axle 91 in the direction of arrow Q. Moving the lever 90 to the unlocked position typically increases the distance between the ends 82 and 84, thereby reducing the force applied to the adjustment shaft 50.

A variation to this embodiment is the use of an ACME thread profile for the adjustment shaft movement with a relatively large length-to-diameter ratio of the male and female thread engagement. Thus, the threaded region 58 of the adjustment shaft 50 and the corresponding threaded region 72 of the base sleeve 70 each utilize an ACME thread profile with a relatively large length-to-diameter ratio. In particular versions, this ratio is within a range of from 0.75:1 to 2:1. In certain versions, a ratio of 1.36:1 has been found suitable. However, it will be appreciated that the present subject matter includes assemblies utilizing different thread ratios and thread profiles different than ACME thread profiles. Further, the present subject matter can use a multiple start thread profile to increase the speed of adjustment. In a particular embodiment, a 1.75 inch, 0.25 inch pitch, 0.5 inch lead stub ACME thread with a double start is used.

Through this means of adjustment, the user does not need to bring additional tools to the jobsite and can quickly adjust the clutch position to a convenient and ergonomically-preferred operating position. This can provide greater life to the clutch as the operator can compensate for any wear and utilize the worn components further in time.

Figure 3:
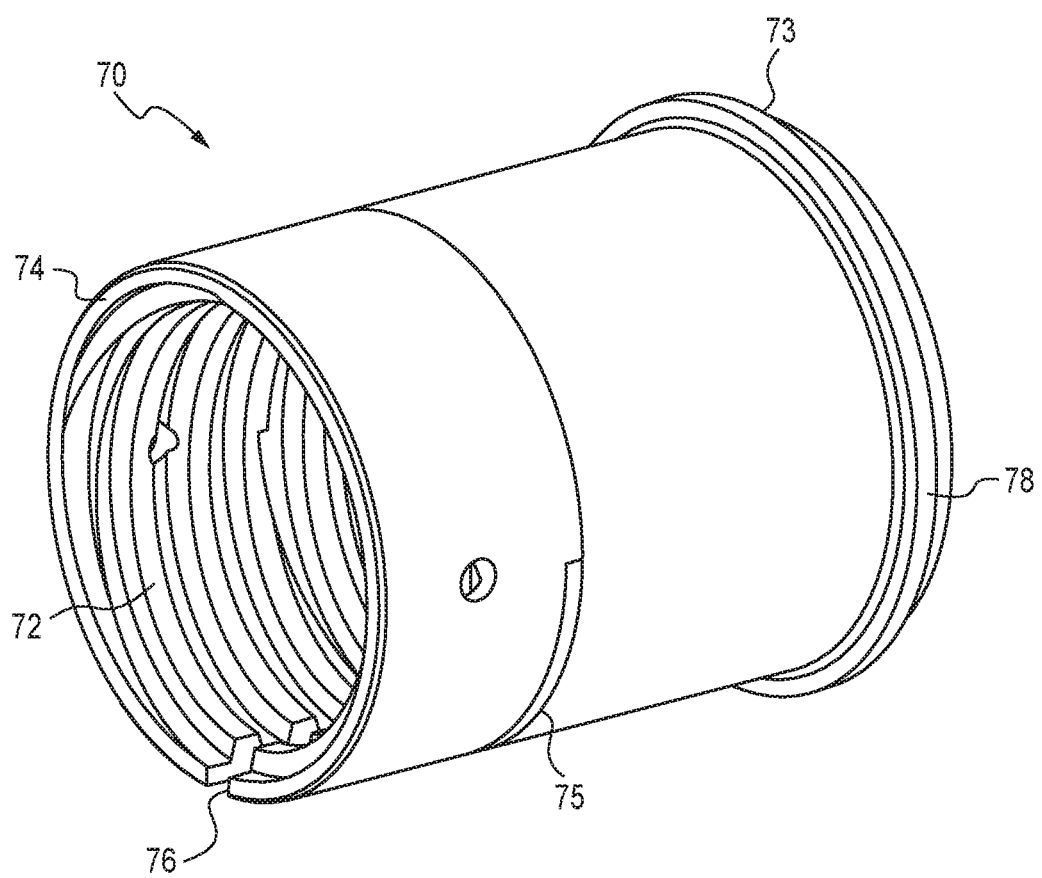
FIG. 3 is a schematic perspective end view of a base sleeve used in the drain cleaning machine of FIGS. 1-2.
Figure 4:
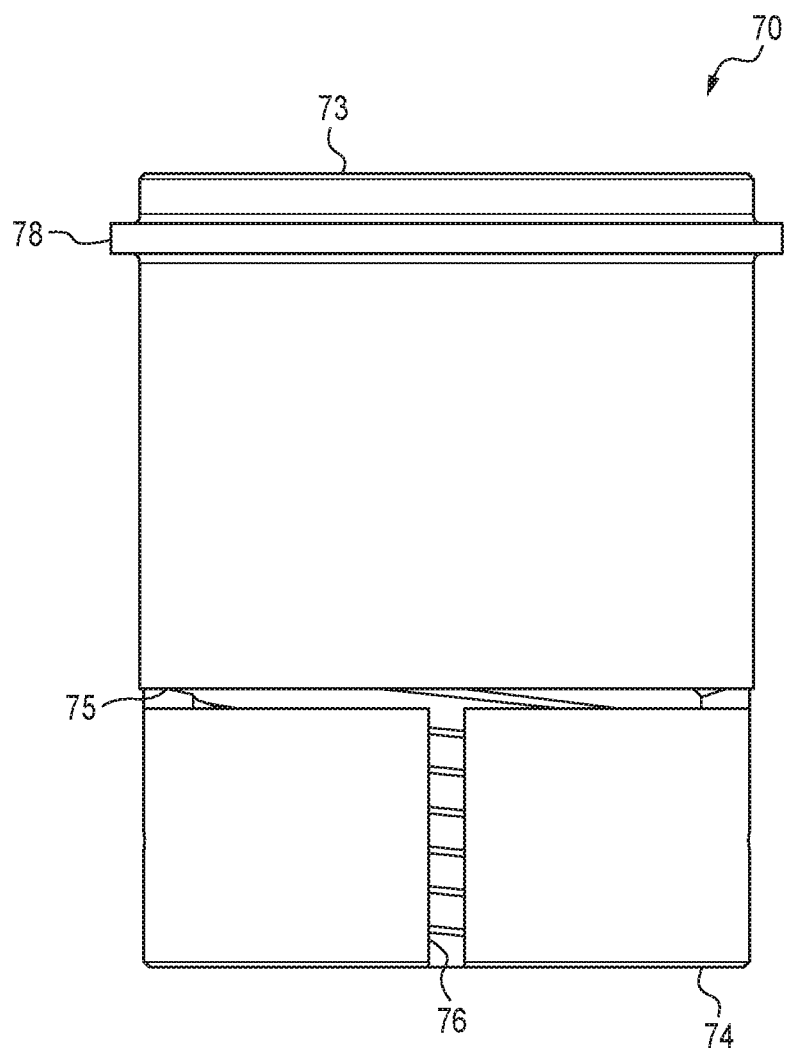
FIG. 4 is a schematic elevational view of the base sleeve depicted in FIG. 3.

In particular versions, the drain cleaning machine 10 comprises a base sleeve 70 as shown in FIGS. 3 and 4. The base sleeve 70 is disposed between the adjustment shaft 50 and the locking clamp 85. The base sleeve 70 defines a proximal end 73 and an opposite distal end 74. A circumferential ridge 78 may be provided adjacent the proximal end 73. The base sleeve 70 defines one or more slots extending through a circumferential wall of the sleeve 70. The slot(s) promote flexure of the base sleeve 70 upon tightening or locking of the locking clamp 85 and specifically the circumferential member 80. Upon tightening or locking of the clamp, the width of the slot(s) is reduced to thereby create the clamping force around the adjustment shaft 50.

In the particular embodiment shown in FIGS. 3 and 4, the base sleeve 70 defines a circumferential slot 75 extending along a portion of the circumference of the sleeve 70; and an axial slot 76 extending from the distal end 74 toward the proximal end 73 to a location intersecting the circumferential slot 75. Typically, the circumferential slot 75 extends along an arc within a range of from about 90° to about 270° with 180° being typical. The circumferential slot 75 is located at an axial location between the ends 73, 74 which is generally aligned with and spaced a distance from the distal end 74 equal or substantially so to the width of the circumferential member 80. Although not wishing to be limited to any particular dimensions, the circumferential slot 75 has a width of 0.060 inches and the axial slot 76 has a width of 0.125 inches. The axial slot 76 extends parallel with the longitudinal axis A shown in FIGS. 1 and 2.

Another embodiment to achieve tool-less clutch adjustment is by use of an assembly having an adjustment shaft with an outwardly and preferably radially extending lever and a coaxial stationary sleeve with a cam profile cut circumferentially. The adjustment shaft can be linearly displaced by moving or rotating the radial lever through the cam profile of the stationary sleeve, thereby inducing axial motion of the adjustment shaft. This configuration can include multiple cam profiles defined around the stationary sleeve, depending on the desired axial linear motion, and utilize one or more guide pins fixed to the adjustment shaft to facilitate navigation through the cam profile. As previously described, the clutch can be compressed or expanded based on the adjustment shaft linear axial position. In certain versions of this embodiment, axial motion of the adjustment shaft during use can be prevented by moving or rotating the radial lever to lock a fixed joint, for example, a bolted joint, between the adjustment shaft and the stationary sleeve.

Specifically, referring to FIGS. 5-8, portions of a drain cleaning machine 10 utilizing another embodiment of an assembly for tool-less clutch adjustment are illustrated. The drain cleaning machine 10 comprises a clutch assembly 120 as previously described and including the noted clutch cones and clutch members. In the embodiment of FIGS. 5-8, the assembly 120 comprises an adjustment shaft 150, a stationary sleeve 170, and a radial locking lever 180, all of which are described in greater detail herein.

Figure 5:
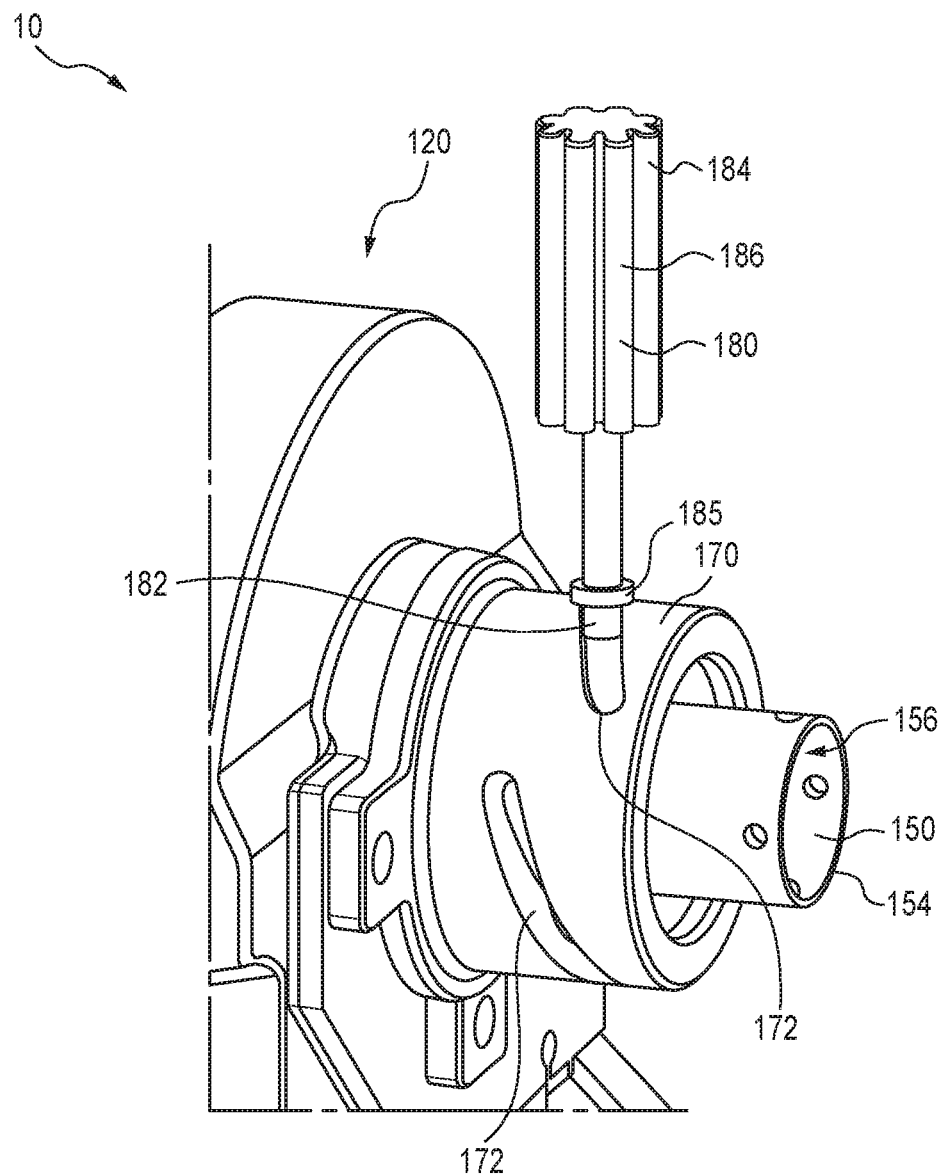
FIGS. 5 to 8 are schematic views of a drain cleaning machine and components utilizing another embodiment of an assembly for tool-less clutch adjustment in accordance with the present subject matter.
Figure 6:
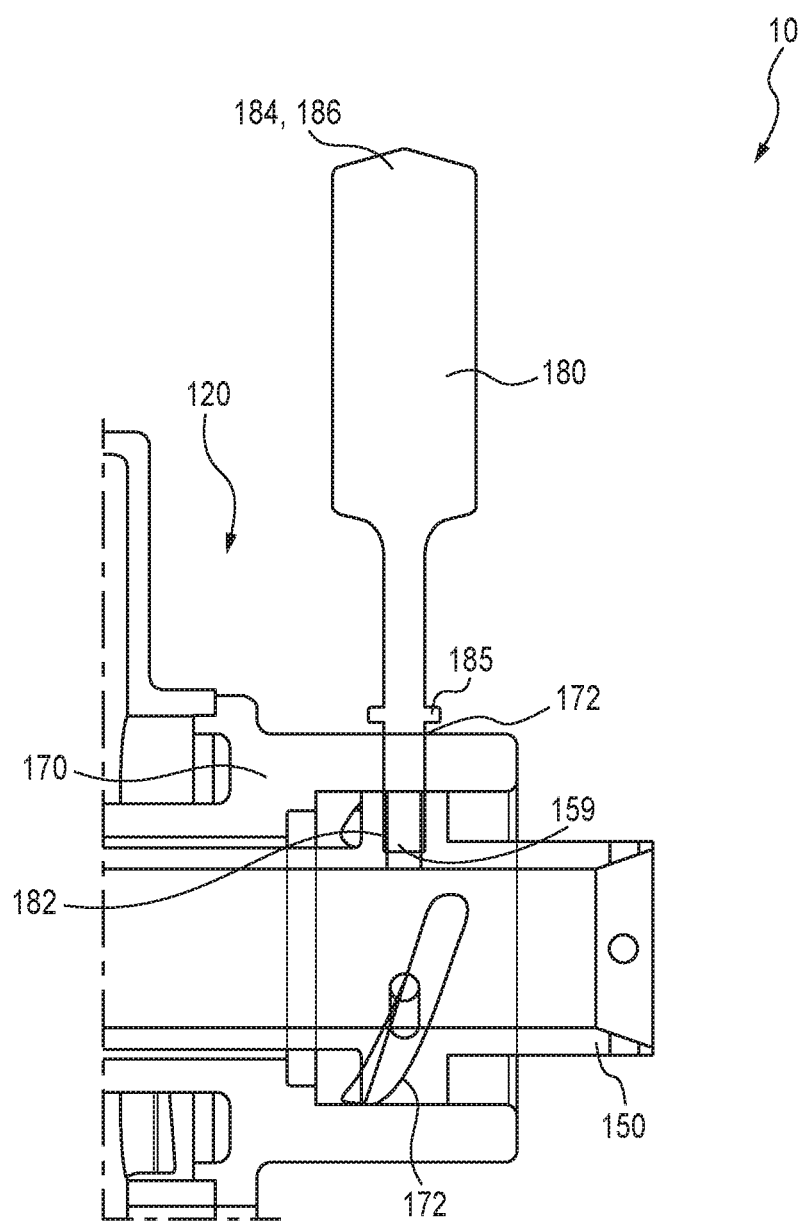
Figure 8:
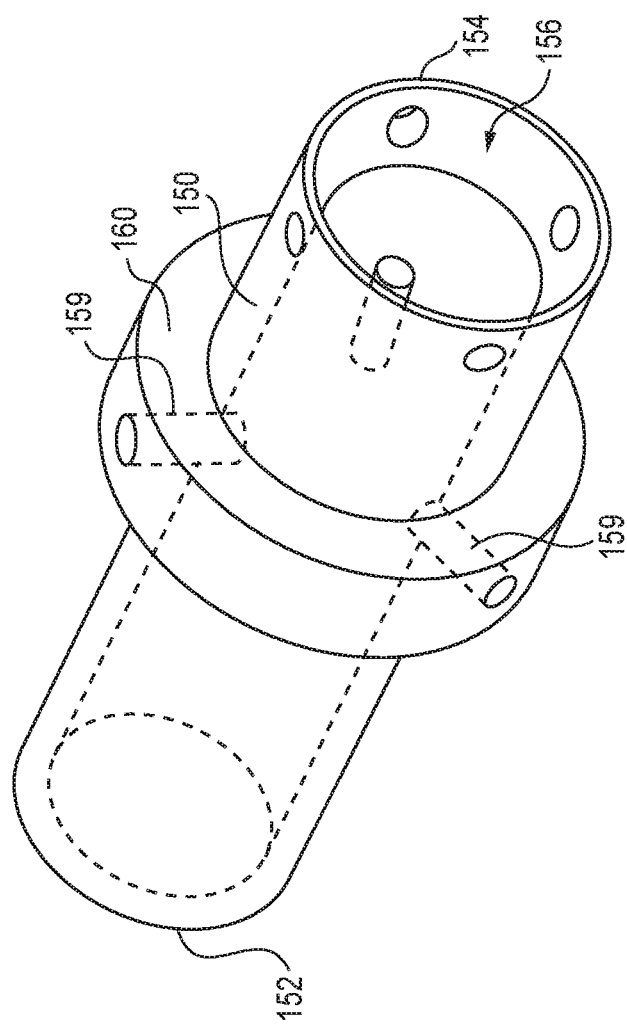
Figure 7:
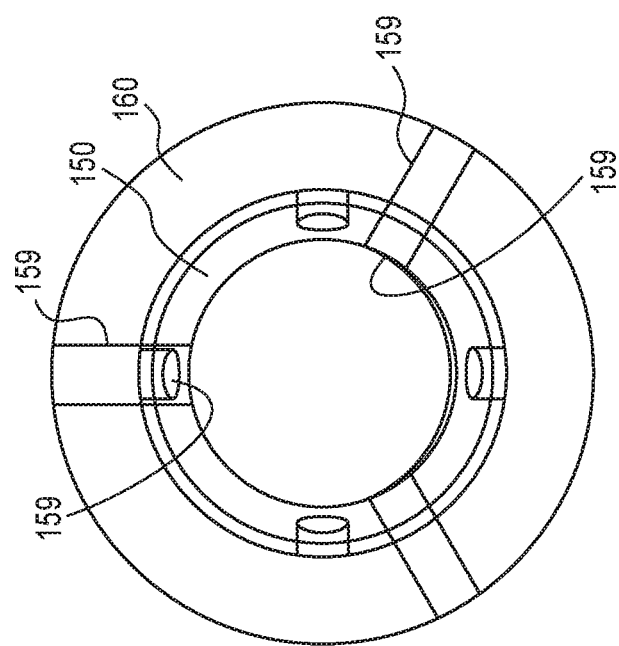
Figure 9:
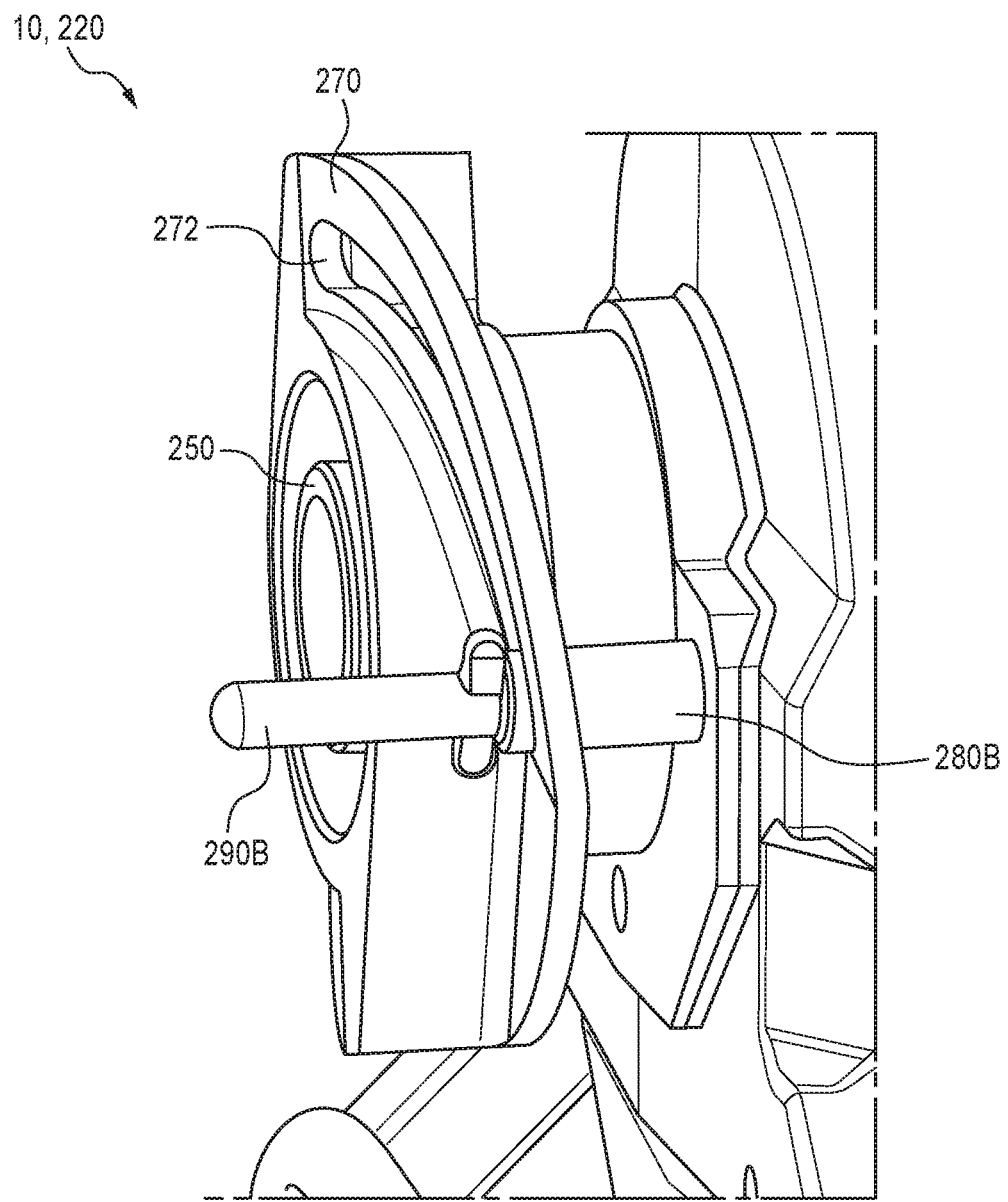
FIGS. 9 to 12 are schematic partial perspective and assembly views of a portion of a drain cleaning machine utilizing another embodiment of an assembly for tool-less clutch adjustment in accordance with the present subject matter.

The adjustment shaft 150 defines a proximal end 152, an opposite distal end 154, and a hollow interior 156 extending between the ends 152, 154. The adjustment shaft 150 also defines one or more apertures 159 which may be threaded in the circumferential wall of the shaft 150 as depicted in FIGS. 5 and 6. The apertures 159 may also be provided in an optional collar 160 affixed to the shaft 150. In this configuration, the apertured collar 160 provides an extension for the apertures 159. These aspects are described in greater detail herein.

The stationary sleeve 170 surrounds or substantially surrounds the adjustment shaft 150. In many versions, the sleeve 170 is concentrically disposed about the adjustment shaft 150. The sleeve 170 is typically affixed to a frame or housing component of the drain cleaning machine 10. The sleeve 170 defines one or more arcuate cam slots 172.

The radial locking lever 180 defines an insertion end 182, an opposite gripping end 184 at which may be disposed a handle 186, and a shoulder 185 located between the insertion end 182 and the gripping end 184. In many versions, a threaded region is defined along the outer surface of the lever 180 at the insertion end 182. The lever 180 and particularly the insertion end 182, is sized and shaped to be inserted within the arcuate cam slots 172 and the apertures 159 of the adjustment shaft 150.

The radial locking lever 180 is removable from the adjustment shaft 150. In certain versions, the attachment could be such that the attachment requires a retaining ring or pin to be removed in order to separate the lever 180 from the shaft 150 in order to prevent inadvertent removal of the lever 180 during use, but the components would be ultimately removable based on normal manufacturing methods to more efficiently create the components.

The axial position of the adjustment shaft 150 in the machine 10 is selected or changed, by placing the lever 180 in the arcuate cam slot 172 in the stationary sleeve 170 and in an aperture 159 in the adjustment shaft 150, and then moving the lever 180 in the cam slot 172. That movement of the lever 180 about the longitudinal axis of the sleeve 170 and the shaft 150 results in axial movement of the shaft 150. As the lever 180 is moved through the arcuate cam slot 172 of the stationary sleeve 170, the axial position of the adjustment shaft 150 changes since the radial lever 180 and the adjustment shaft 150 are fixed relative to each other and the arcuate cam slot 172 changes the position of the radial locking lever 180 relative to the position of the stationary sleeve 170.

In certain versions, the radial locking lever 180 is typically not removed from the adjustment shaft 150. Instead, the radial locking lever 180 is moved or rotated and a threaded joint between the radial locking lever 180 and the adjustment shaft 150 allows the radial locking lever 180 to move radially inward towards the center of the adjustment shaft 150 until a shoulder 185 in the radial locking lever 180 contacts the stationary sleeve 170. This configuration creates a fastened joint similar to a screw being turned into the adjustment shaft 150 until the head of the screw reaches the stationary sleeve 170.

In certain versions, the insertion end 182 of the radial locking lever 180 includes a threaded region, for example male threads that engage female threads cut directly into the adjustment shaft 150 or into an optional shaft collar 160 or similar component that is fixed onto the adjustment shaft 150. When the radial locking lever 180 is rotated about its longitudinal axis, the position of the radial locking lever 180 moves inward toward the axis of the adjustment shaft 150, radial to the adjustment shaft, until the shoulder 185 of the radial locking lever 180 contacts the stationary sleeve 170. The threaded connection allows the position of the radial locking lever 180 to be fixed relative to the stationary sleeve 170 and, since the radial locking lever 180 is fixed radially to the adjustment shaft 150, the adjustment shaft 150 is likewise fixed axially relative to the stationary sleeve 170.

Yet another embodiment to accomplish tool-less clutch adjustment is by use of an assembly having an adjustment shaft with a sloping cam component that extends helically around the shaft to engage a similar sloped helix surface on one or more stationary sloped component(s). By manually loosening attachment fasteners, the adjustment shaft can be manually rotated such that the helical cam of the adjustment shaft slides against the sloped surface of the stationary component(s), thereby producing axial linear motion of the adjustment shaft. As previously described, the clutch is compressed or expanded based on the adjustment shaft linear axial position. The adjustment shaft can be locked in position via hand-driven fasteners.

Referring to FIGS. 9 to 12, a portion of a drain cleaning machine 10 with an adjustable clutch assembly 220 is depicted. The clutch assembly 220 comprises the previously described assembly of clutch cones and clutch members. In the embodiment of FIGS. 9 to 12, the noted assembly 220 comprises an adjustment shaft 250, a sloping cam component 270, one or more stationary sloped components 280 such as stationary sloped components 280A and 280B, and one or more attachment fasteners 290 such as fasteners 290A and 290B. The adjustment shaft 250 and the cam component 270 are integral with each other or otherwise affixed to each other.

Figure 10:
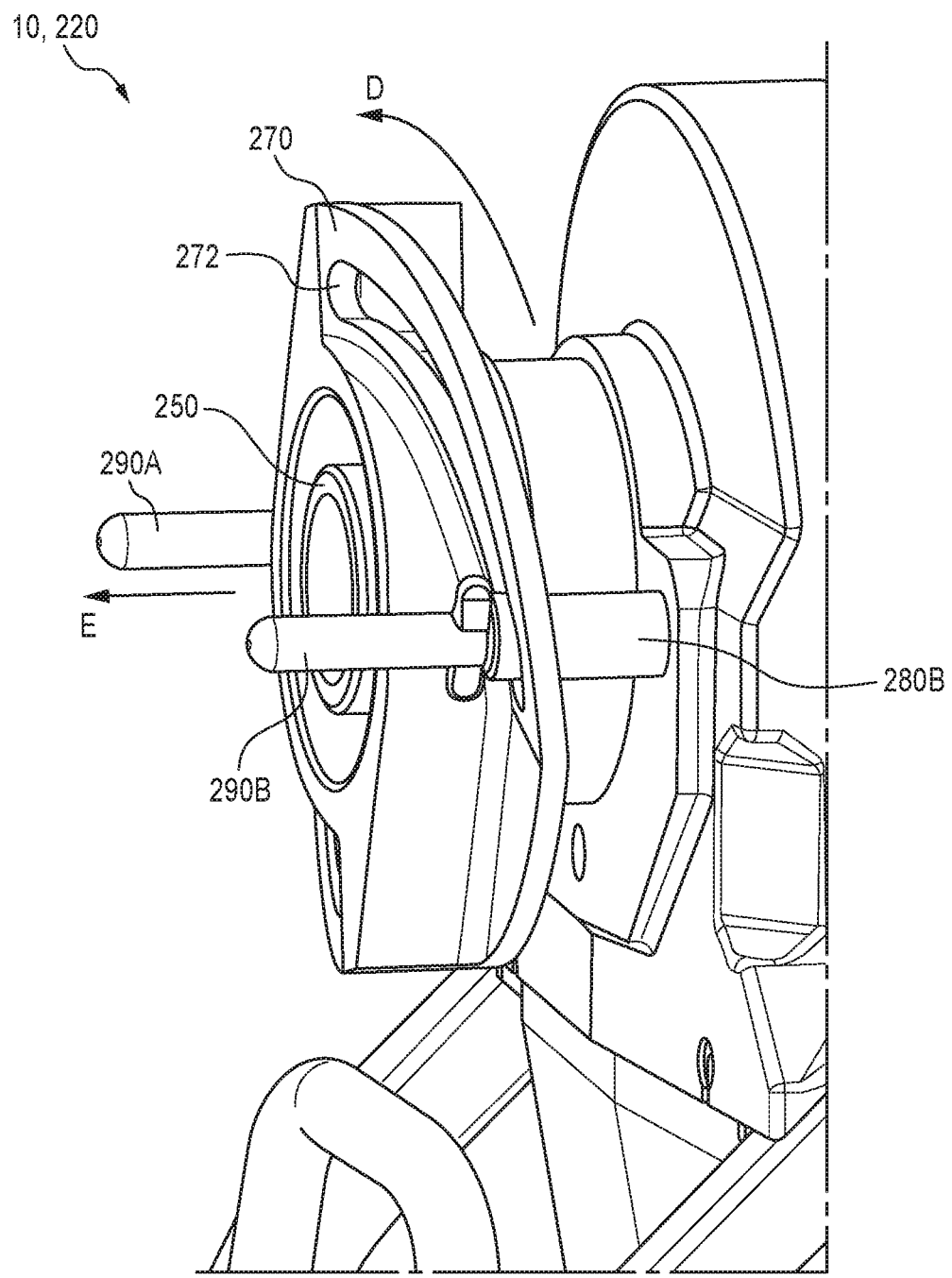
Figure 11:
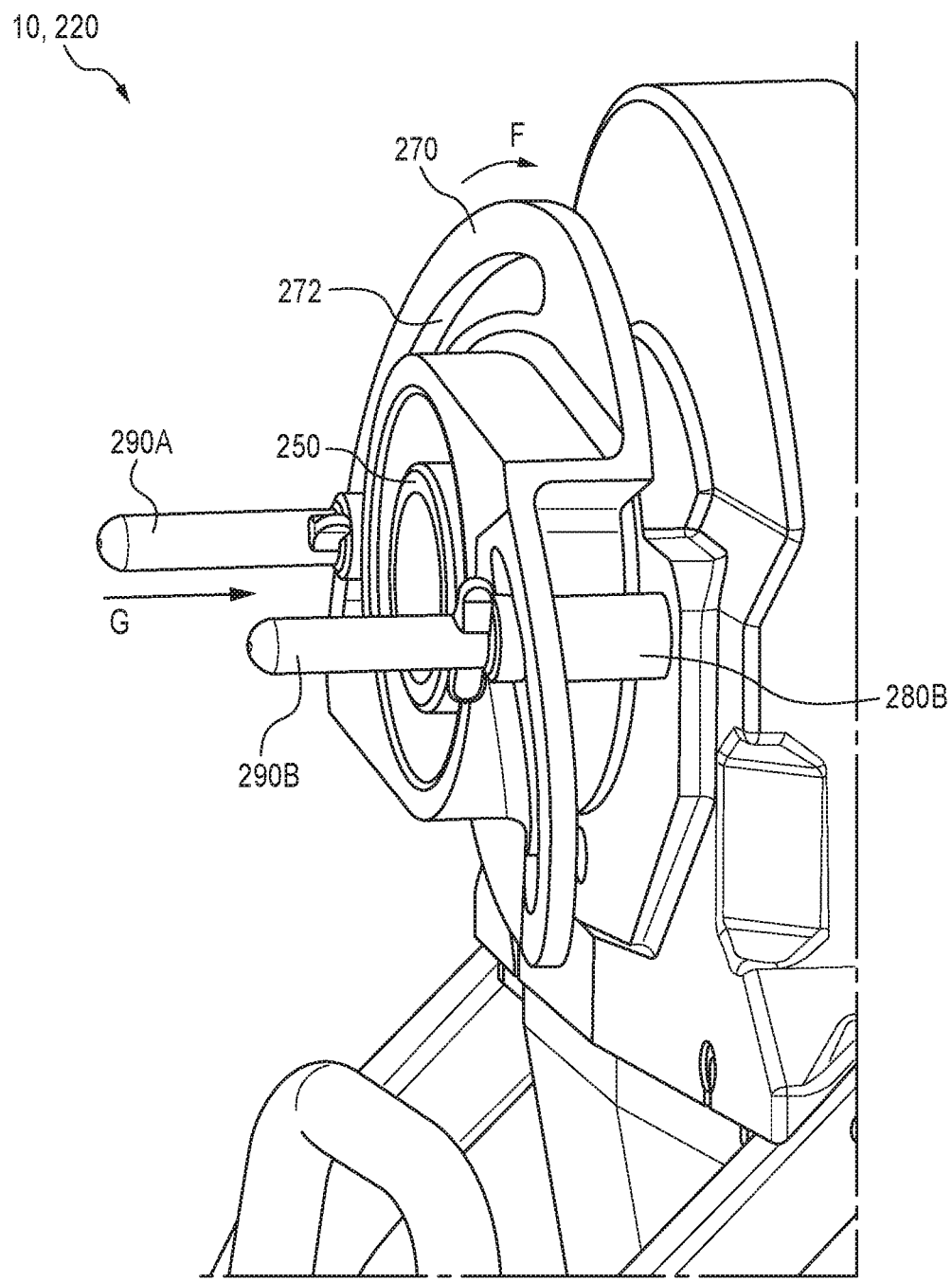
Figure 12:
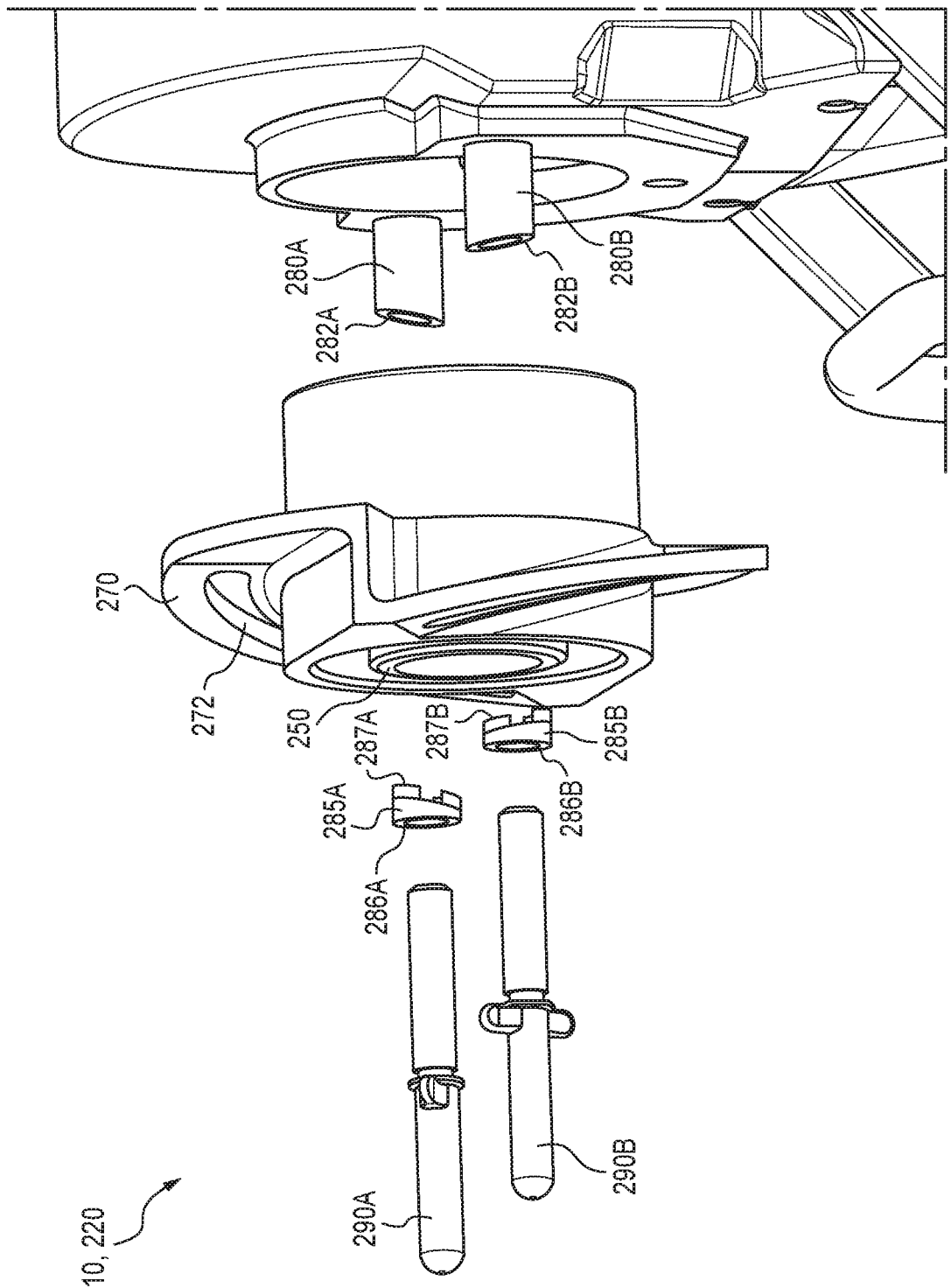
Figure 13:
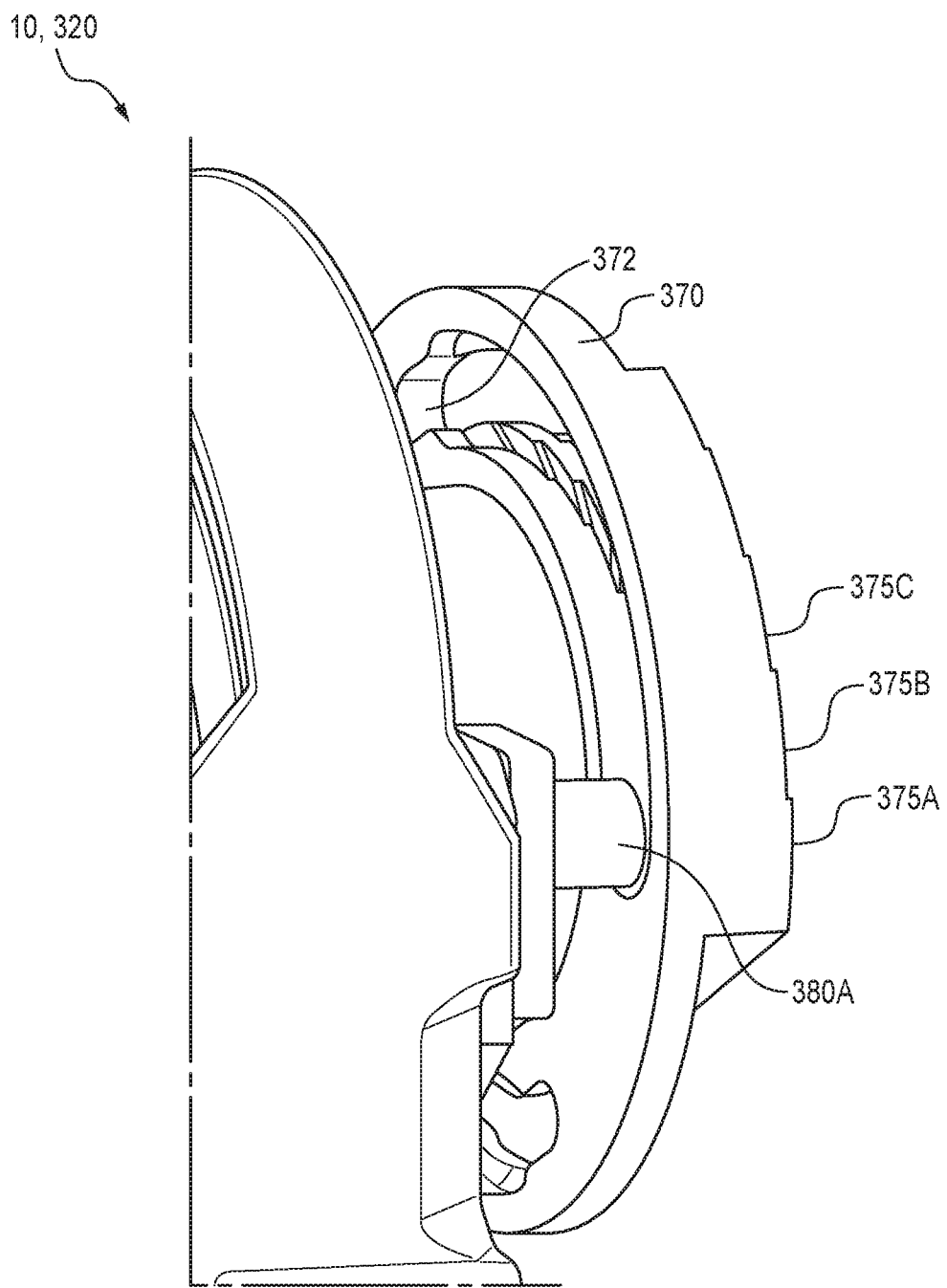
FIGS. 13 to 16 are schematic partial perspective and assembly views of a portion of a drain cleaning machine utilizing another embodiment of an assembly for tool-less clutch adjustment in accordance with the present subject matter.

Specifically, in the embodiment depicted in FIGS. 9-12, the adjustment shaft 250 is axially displaced in the direction of arrow E in FIG. 10 by loosening the fasteners 290A, 290B by hand; and rotating the cam component 270 in the direction of arrow D in FIG. 10. FIG. 10 depicts a fully extended or substantially so, position of the adjustment shaft 250. In order to retract the adjustment shaft 250 into the drain cleaning machine 10, the fasteners 290A, 290B are loosened by hand, and the cam component 270 is rotated in the direction of arrow F in FIG. 11. Such movement results in axial movement of the adjustment shaft 250 in the direction of arrow G in FIG. 11. FIG. 11 shows a fully retracted or substantially so, position of the adjustment shaft 250. The attachment fasteners 290 are adapted to selectively engage one or more corresponding stationary sloped component(s) 280. As noted, the adjustment shaft 250 and the sloping cam component 270 are integral with each other or affixed to each other. In FIG. 12, it will be understood that a majority length portion of the adjustment shaft 250 extends into the machine 10, but is not shown for clarity in describing this embodiment.

The sloping cam component 270 defines one or more guide slots 272 extending arcuately around the adjustment shaft 250. Each guide slot 272 is sized and shaped to slidingly receive a corresponding stationary sloped component 280, e.g., 280A or 280B. The region of the sloping cam component 270 defining the guide slots 272 extends in a helical fashion about the longitudinal axis of the adjustment shaft 250.

Each of the stationary sloped components, e.g., 280A, 280B, includes a distal sloped face 282. Thus, component 280A includes a distal sloped face 282A and component 280B includes a distal sloped face 282B as shown in FIG. 12.

The assembly 220 may optionally comprise corresponding bushings 285, i.e., bushings 285A and 285B which are configured to be slidably disposed within the corresponding guide slots 272. As shown in FIG. 12, each bushing defines a flat front face 286 for engaging a corresponding fastener 290 and an oppositely directed sloped face 287 for engaging a sloped distal face 282 of a corresponding stationary sloped component 280.

Another such means of tool-less clutch adjustment is by use of an assembly having an adjustment shaft with discrete axial steps to engage fixed height bosses on the stationary element, as shown in FIGS. 13-16. By loosening the hand-driven fasteners, the adjustment shaft could be manually rotated and simultaneously pushed or pulled to engage a different axial step against the stationary boss(es) to result in a different axial linear position of the adjustment shaft. Again, the clutch is compressed or expanded based on the adjustment shaft linear axial position. The position of the adjustment shaft can then be locked via hand fasteners between the adjustment shaft and the fixed stationary member(s).

Referring to FIGS. 13 to 16, a portion of a drain cleaning machine 10 with an adjustable clutch assembly 320 is depicted. The clutch assembly 320 comprises the previously described assembly of clutch cones and clutch members. In the embodiment of FIGS. 13 to 16, the noted assembly 320 comprises an adjustment shaft 350, a cam component 370, one or more stationary bosses 380 such as stationary bosses 380A and 380B, and one or more attachment fasteners 390 such as fasteners 390A and 390B. The adjustment shaft 350 and the cam component 370 are integral with each other or otherwise affixed to each other.

Figure 14:
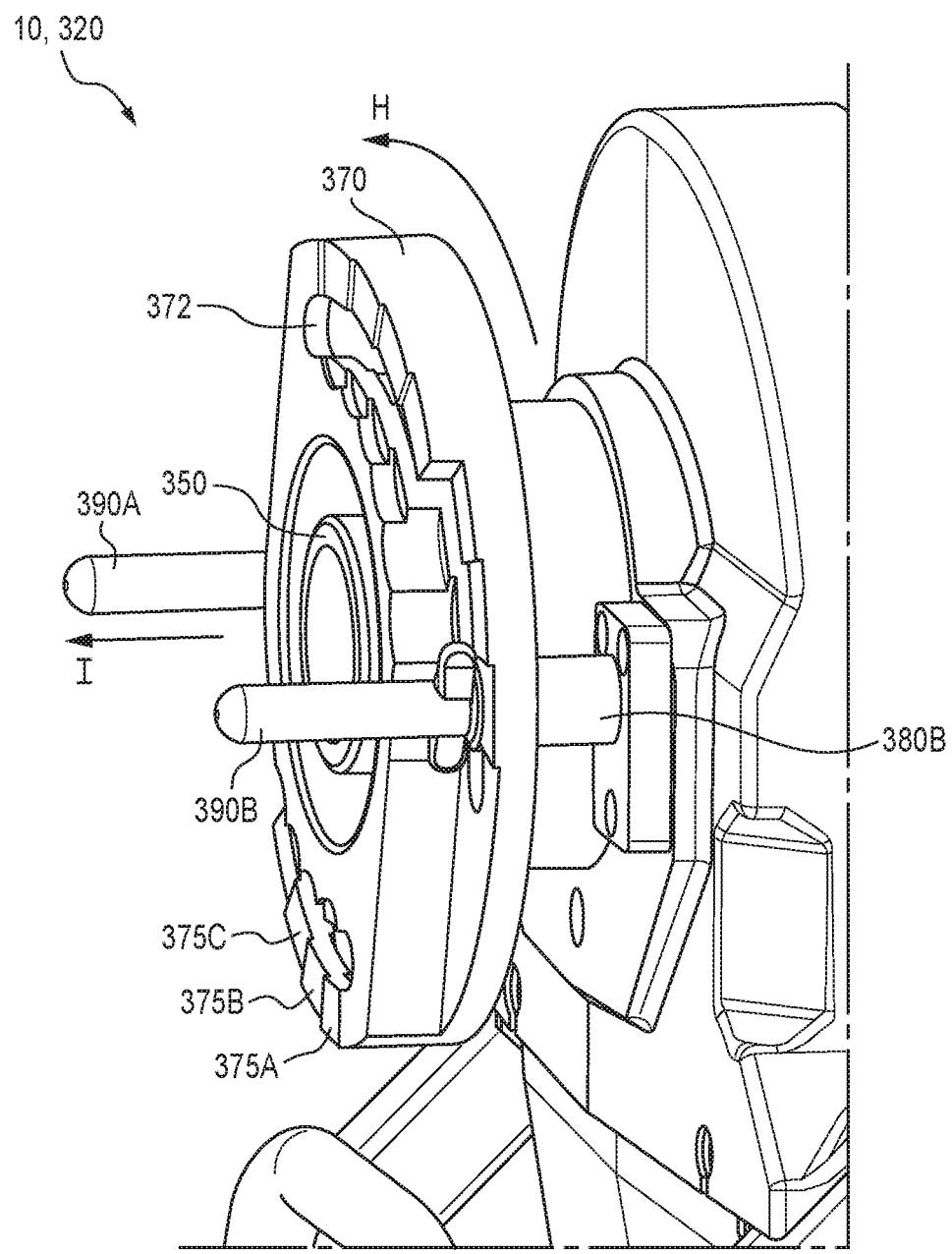
Figure 15:
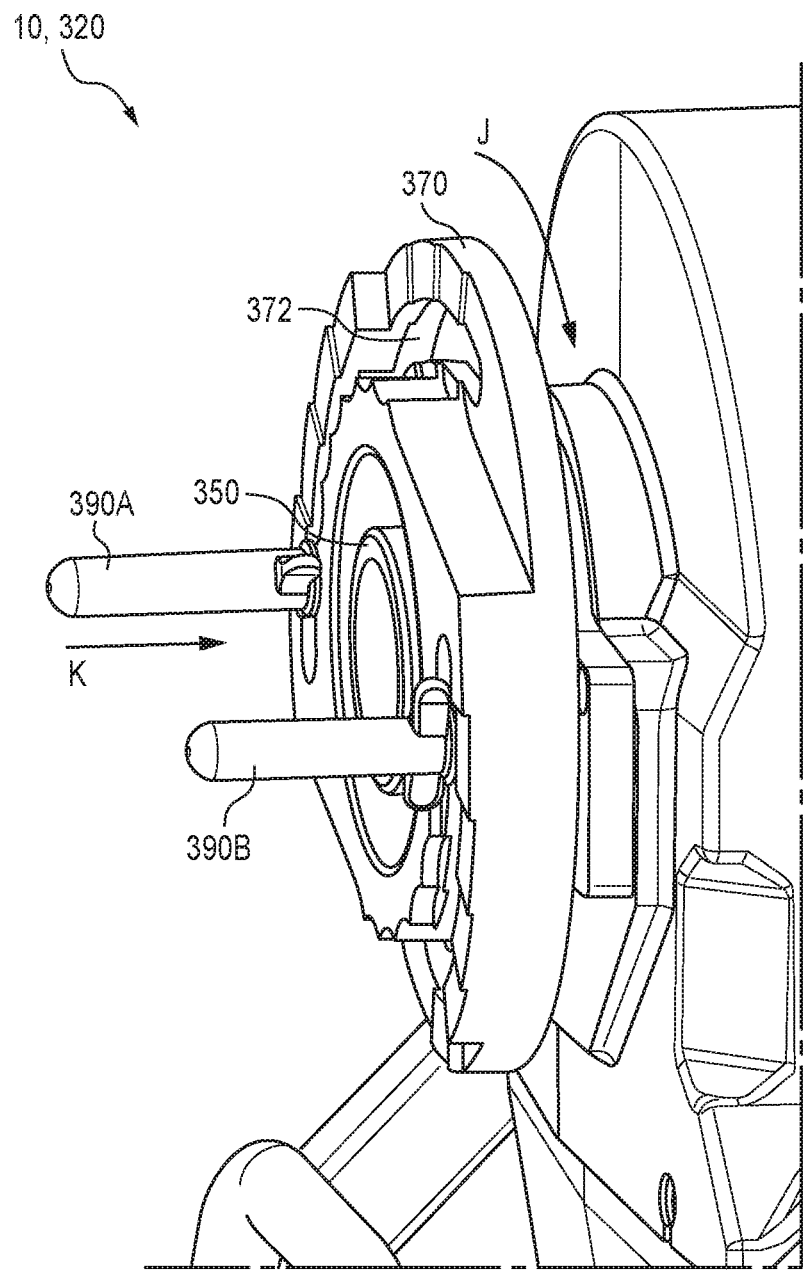
Figure 16:
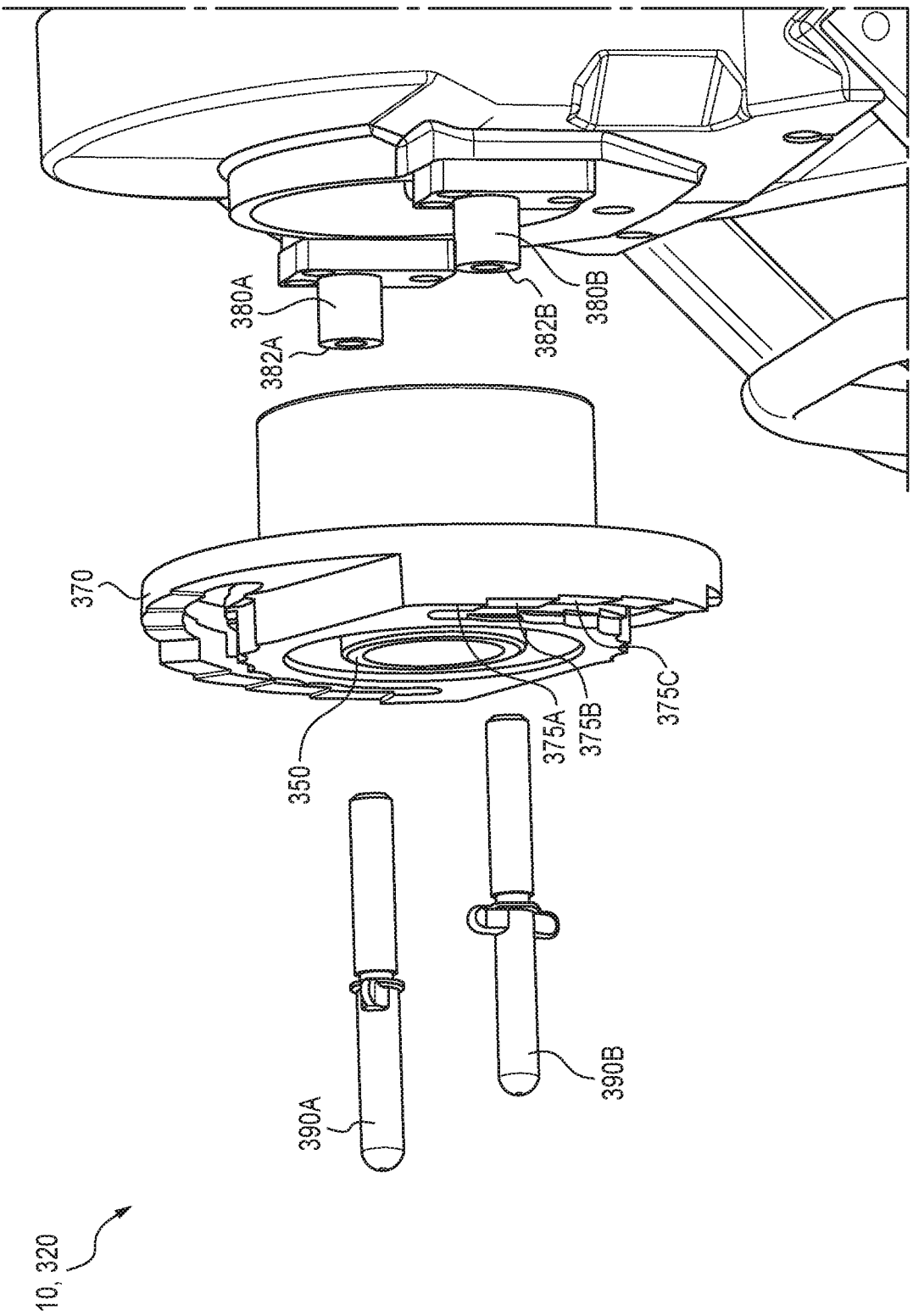

Specifically, in the embodiment depicted in FIGS. 13-16, the adjustment shaft 350 is axially displaced in the direction of arrow I in FIG. 14 by loosening the fasteners 390A, 390B by hand; and rotating the cam component 370 in the direction of arrow H in FIG. 14. FIG. 14 depicts a fully extended or substantially so, position of the adjustment shaft 350. In order to retract the adjustment shaft 350 into the drain cleaning machine 10, the fasteners 390A, 390B are loosened by hand, and the cam component 370 is rotated in the direction of arrow J in FIG. 15. Such movement results in axial movement of the adjustment shaft 350 in the direction of arrow K in FIG. 15. FIG. 15 shows a fully retracted or substantially so position of the adjustment shaft 350. The attachment fasteners 390 are adapted to selectively engage corresponding stationary bosses 380. As noted, the adjustment shaft 350 and the cam component 370 are integral with each other or affixed to each other. In FIG. 16, it will be understood that a majority length portion of the adjustment shaft 350 extends into the machine 10, but is not shown for clarity in describing this embodiment.

The cam component 370 defines one or more guide slots 372 extending arcuately around the adjustment shaft 350. Each guide slot 372 is sized and shaped to slidingly receive a corresponding stationary boss 380, e.g., 380A or 380B. The region an outer face of the cam component 370 defining the guide slots 372 extends in a stepped fashion about the longitudinal axis of the adjustment shaft 350. That is, the cam component 370 defines a plurality of steps 375 which are depicted as steps 375A, 375B, 375C, etc. The steps 375 are located adjacent or near the guide slot 372. Each step has a different height as compared to an adjacent step. And, the steps are arranged along the guide slot 372 such that the steps progressively increase in height or progressively decrease in height. The present subject matter includes a plurality of collections of progressively increasing/decreasing steps. For example, the referenced figures illustrate two collections of progressively increasing/decreasing steps.

Each of the stationary bosses, e.g., 380A, 380B, includes a distal flat face 382. Thus, boss 380A includes a distal flat face 382A and boss 380B includes a distal flat face 382B.

Figure 17:
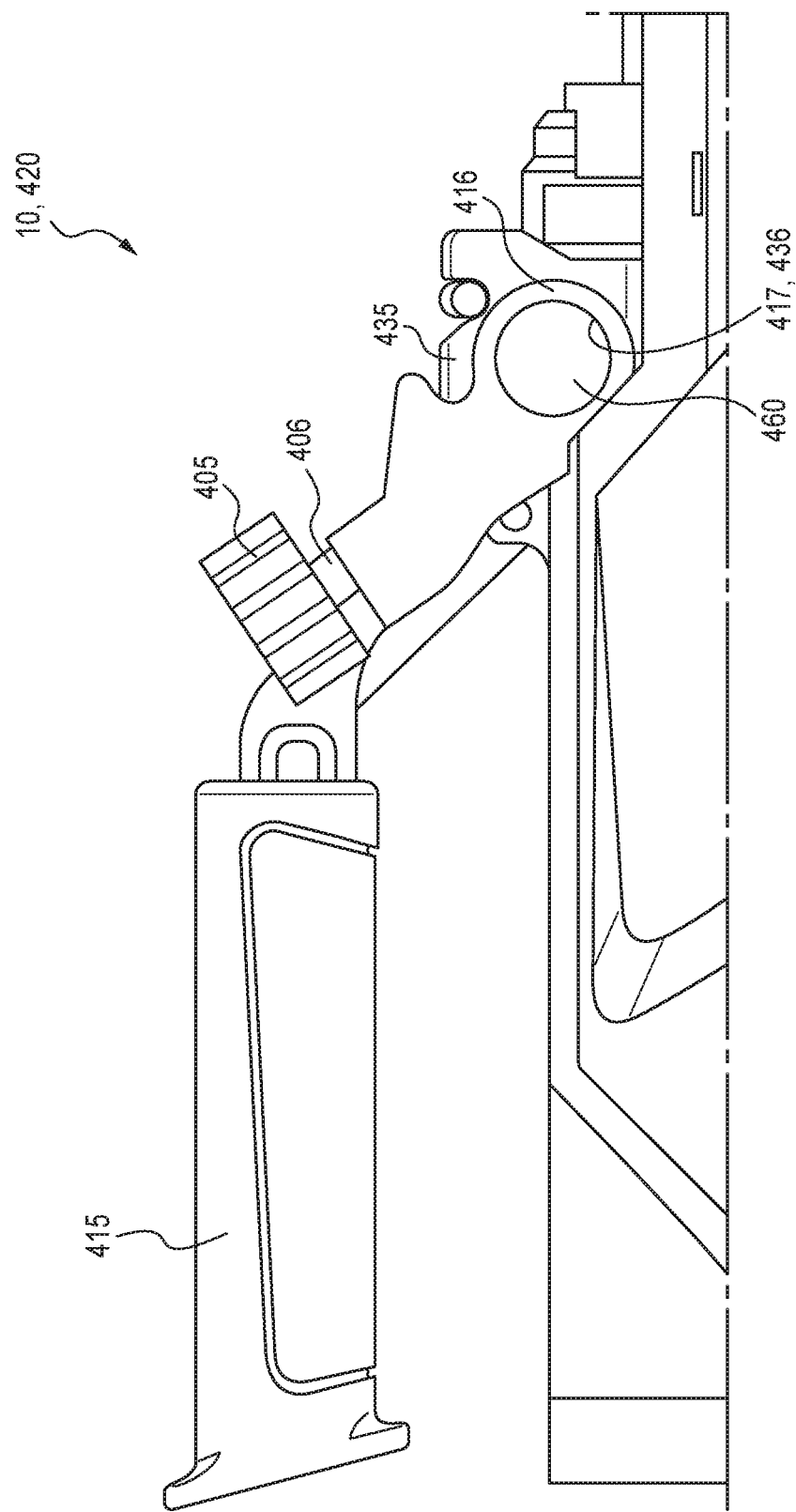
FIGS. 17 to 20 are schematic partial elevational view and various additional views of a portion of a drain cleaning machine utilizing another embodiment and a variant version of an assembly for tool-less clutch adjustment in accordance with the present subject matter.
Figure 18:
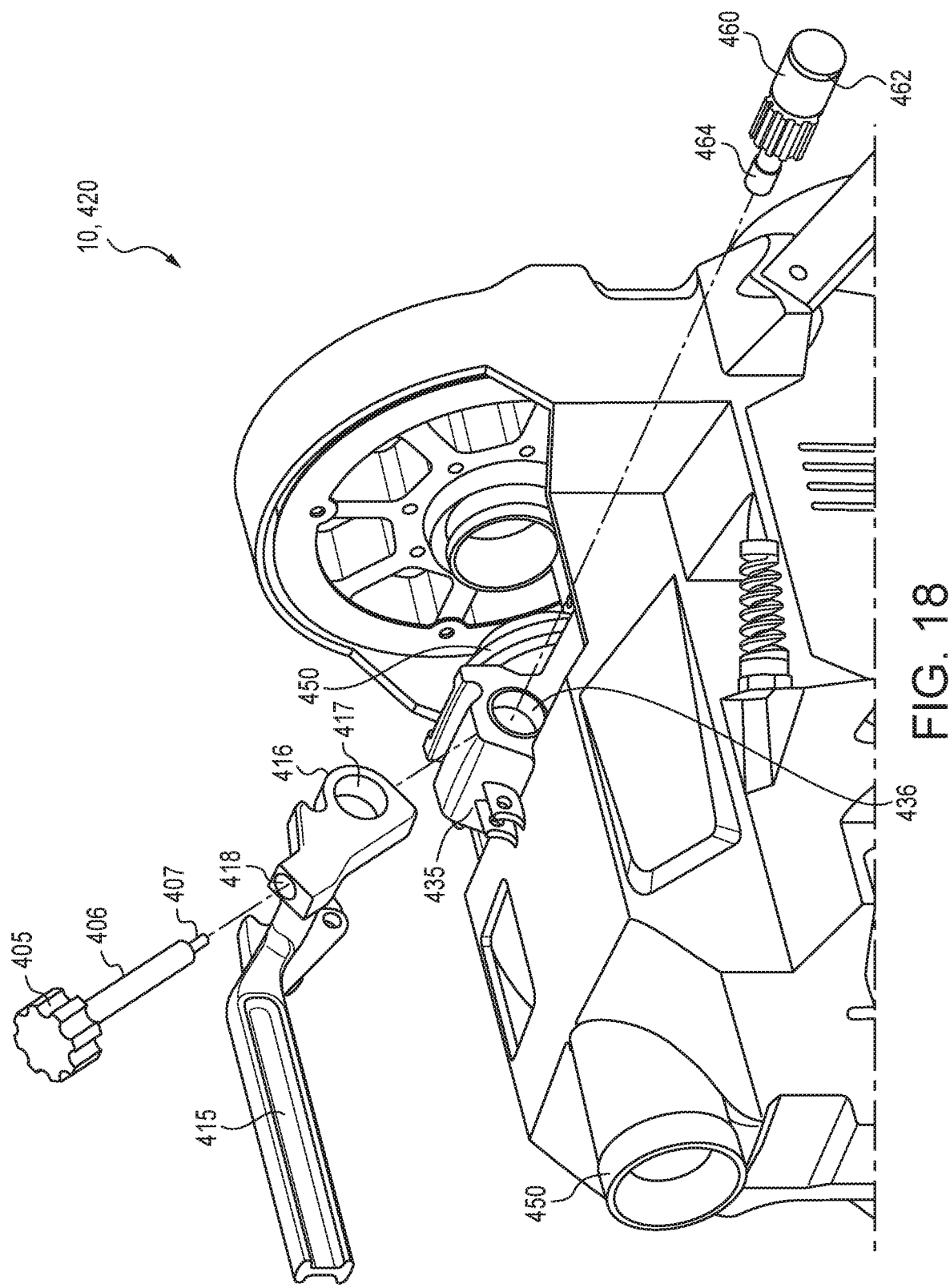

Yet another way to adjust clutch position is by use of an assembly having provisions for shifting the opposite side of the clutch joint as compared to all the embodiments described herein. In this assembly, a knob or other member integrated into the primary clutch actuation device, e.g., pivoting handle, is rotated or otherwise moved such as shown in FIG. 17. An in-line worm gear, then, simultaneously turns and creates rotation to a perpendicular pinion shaft, which translates its rotational motion to linear axial travel to the adjustment shaft via a gear rack profile. This axial travel results in the clutch cones compressing the clutch, changing the clamp diameter of the clutch mechanism. After adjustment of the clutch, the actuation handle is moved, rotated, or otherwise displaced to induce the typical clutch engagement to the rotating drain cleaning cable. This movement of the actuation handle is transmitted through the non-rotating worm gear into the pinion shaft.

Another variation of the above noted assembly is to directly rotate the pinion shaft by hand to move the adjustment shaft and vary the clutch cone position in the clutch assembly. In this version, the drive mechanism between the actuation handle and the pinion shaft is disconnected during clutch adjustment to allow the handle to remain stationary while the adjustment occurs. This could be accomplished by a spline engagement between the pinion and handle that would be disengaged when adjustment is desired, then re-engaged during normal machine operation.

Figure 23:
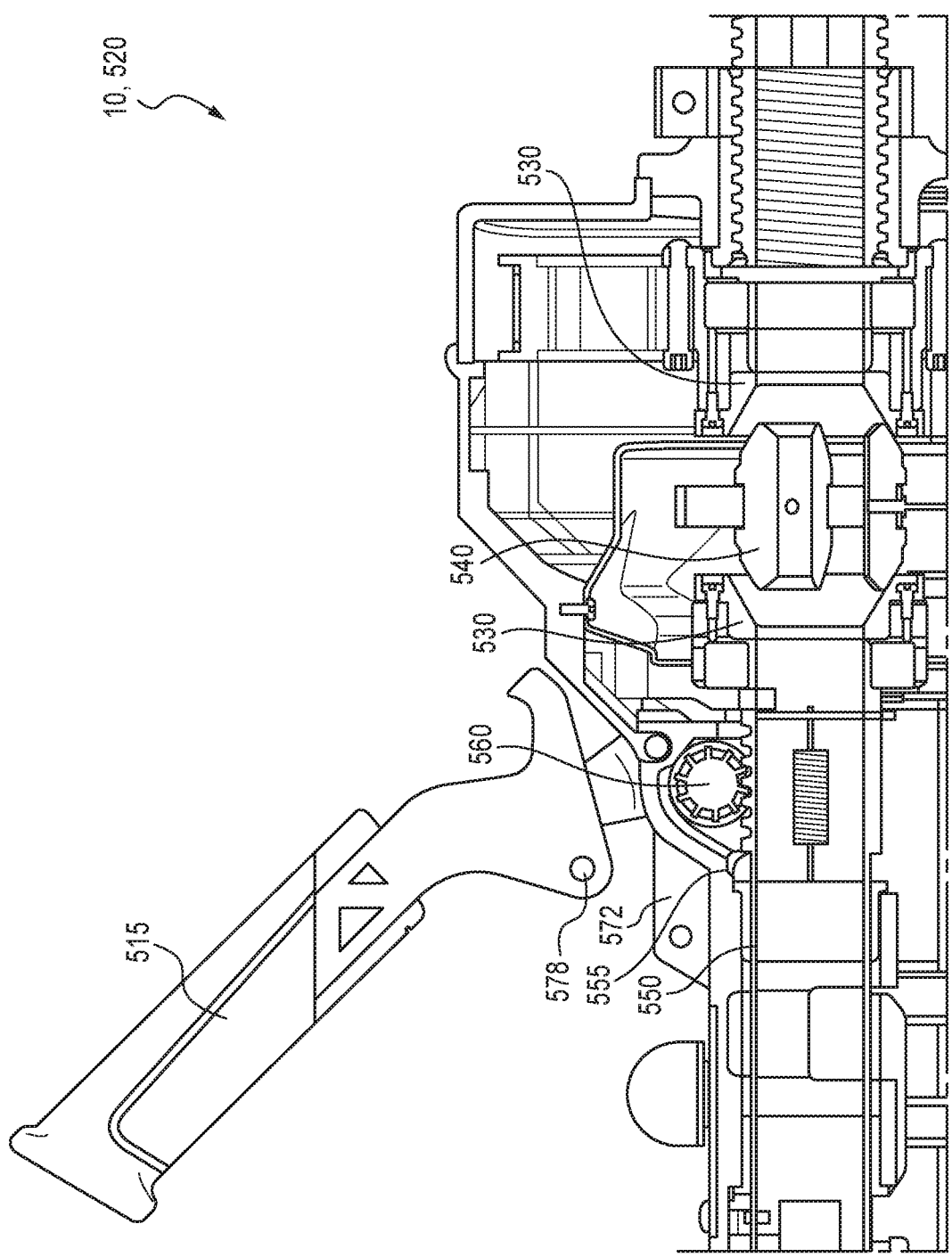

Specifically, referring to FIGS. 17-20, a portion of a drain cleaning machine 10 with an adjustable clutch assembly 420 is shown. The clutch assembly 420 comprises the previously described assembly of clutch cones and clutch members. In the embodiment of FIGS. 17-20, the noted assembly comprises an adjustment shaft 450, a pinion shaft 460, a clutch actuation handle 415, and a clutch adjustment member 406 with a worm gear 407. It will be understood that the adjustment shaft 450 is located on an opposite side of the clutch cones 430 and clutch members 440 as compared to the previously described adjustment shafts 50, 150, 250, and 350. The adjustment shaft 450 and its location is similar to the adjustment shaft 550 and its location depicted in FIGS. 23 and 25. The adjustment shaft 450 defines a proximal end and an opposite distal end. The proximal end of the adjustment shaft 450 is adjacent the clutch cones 430. The adjustment shaft 450 defines a hollow interior extending between the proximal and distal ends. The adjustment shaft 450 also defines a longitudinal axis. The actuation handle 415 includes a base 416 defining a passage 417 sized and shaped to receive the pinion shaft 460. The machine 10 includes a housing or frame portion 435 that also defines a passage 436 sized and shaped to receive the pinion shaft 460. Upon assembly, the passages 417 and 436 are aligned and the pinion shaft 460 inserted in the aligned passages 417 and 436. Depending upon the axial position of the pinion shaft 460, the actuation handle 415 can be pivoted or otherwise displaced about the longitudinal axis of the pinion shaft 460. These aspects are described in greater detail herein.

The actuation handle 415 includes a receptacle 418 in the base 416. The receptacle 418 is sized and shaped to receive the clutch adjustment member 406. In the particular version shown in the referenced figures, the clutch adjustment member 406 includes a worm gear 407 and a knob or handle member 405.

When the clutch adjustment knob 405 is rotated, the worm gear 407 rotates and imparts rotation through a worm wheel 462 to the pinion shaft 460. As the pinion shaft 460 rotates, the adjustment shaft 450, with clutch cone(s) attached, is linearly translated, modifying the gap between the clutch cones and, therefore, reducing or enlarging the clutch opening for different cable sizes. When the operator uses the sectional drain cleaner 10, the user rotates or moves the clutch actuation handle 415. When the handle 415 is rotated or moved downward to the position shown in FIG. 17, the gear teeth of the worm gear 407 remain in contact with the worm wheel 462 of the pinion shaft 460, thereby causing the worm wheel 462 and pinion shaft 460 to rotate. This rotation of the pinion shaft 460 linearly translates the adjustment shaft 450 and clutch cone(s) to reduce the clutch cone gap, thereby causing the clutch jaw spacing to reduce and make contact with the cable, imparting rotation to the cable for proper drain cleaning.

Figure 19:
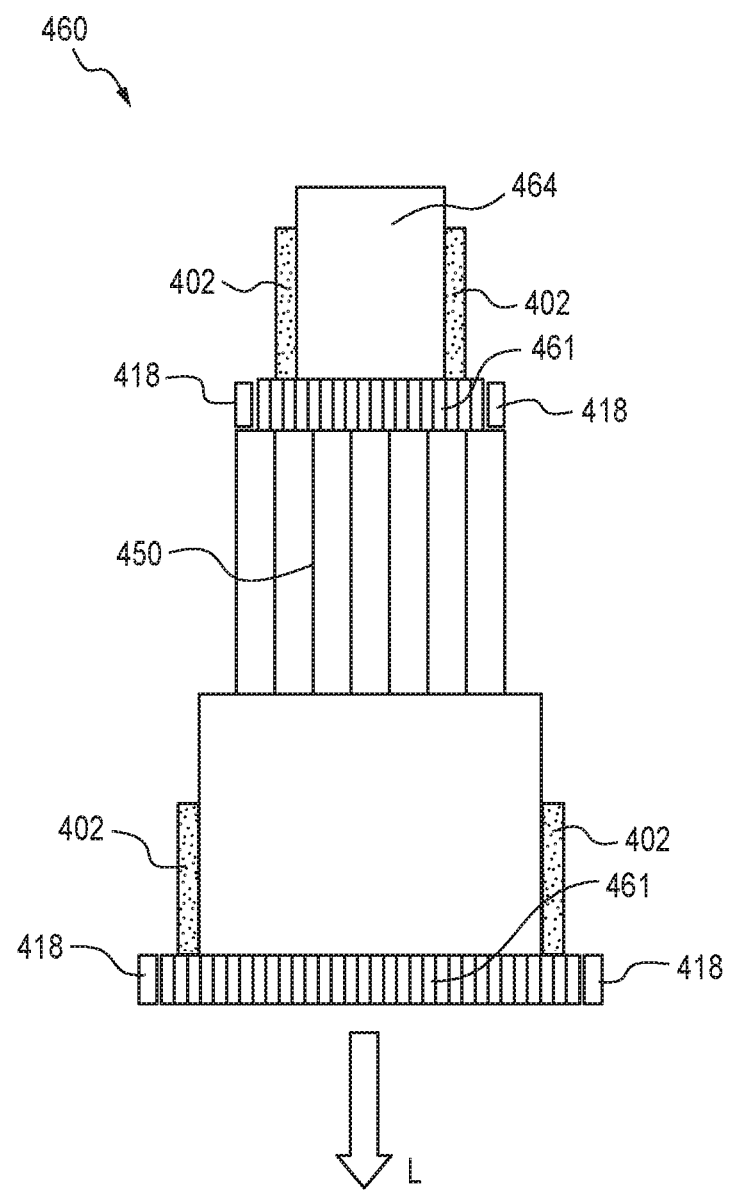
Figure 20:
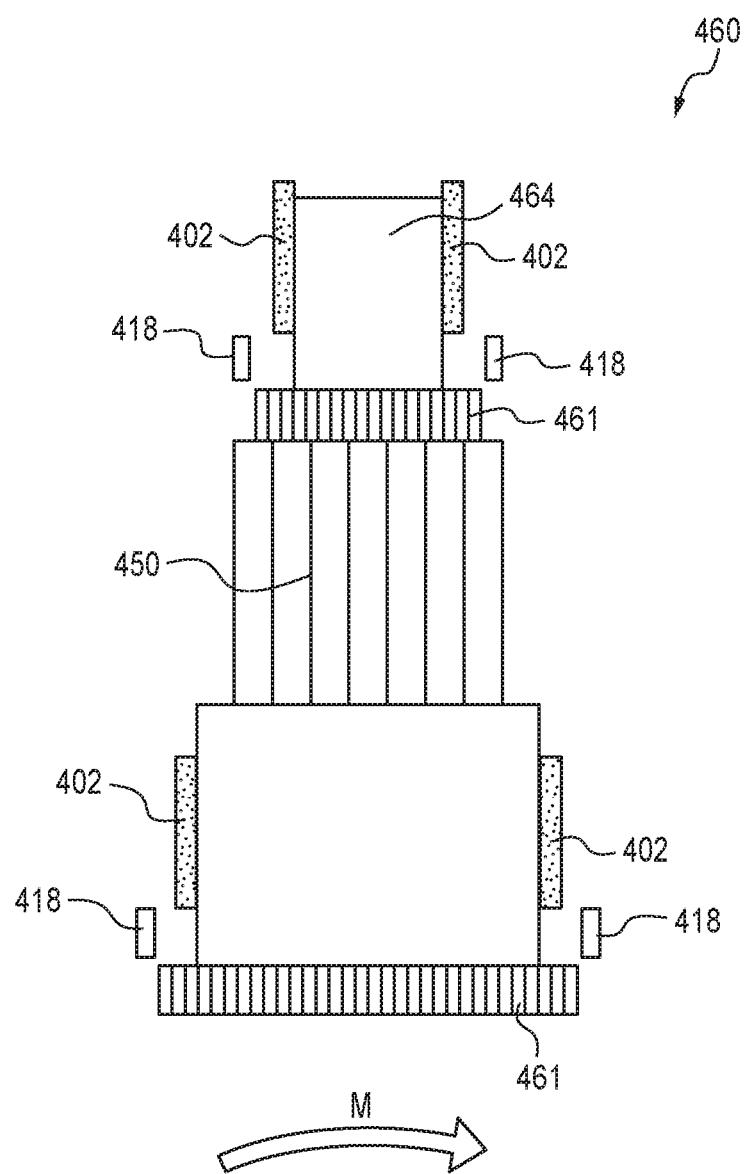

In a variant version, the pinion shaft 460 can be selectively disengaged from the actuation handle 415. In this version, schematically depicted in FIGS. 19 and 20, a pinion shaft 460 includes two lengthened cylindrical areas with male splines 461 and gear teeth that engage the adjustment shaft gear rack. A representative gear rack is described herein in association with FIGS. 23 and 25 and shown in those figures as gear rack 555. Bushings 402 in the housing 435 support a section of the cylindrical surfaces of the pinion shaft 460. And the male splines 461 of the pinion shaft 460 engage female splines 418 in the actuation handle 415. When the handle 415 is engaged to the adjustment shaft 460, rotation of the handle 415 translates the adjustment shaft 450 linearly via the gear teeth of the pinion shaft 460 and the gear rack profile in the adjustment shaft 450. If the pinion shaft 460 is pulled axially outward in the direction of arrow L in FIG. 19, this disengages the actuation handle 415 from the adjustment shaft 450. Thus, the female splines 418 of the actuation handle 415 are no longer in contact with the male splines 461 of the pinion shaft 460. In this fashion, a knob or lever mounted to the pinion shaft 460 can be used by the user to rotate the pinion shaft 460 such as in the direction of arrow M shown in FIG. 20, thereby extending or retracting the adjustment shaft 450 linearly via the gear teeth that remain meshed, without affecting the position of the actuation handle 415. Thus, the pinion shaft 460 is selectively displaceable between (i) a free position in which rotation of the pinion shaft 460 is independent of the position of the handle 415, and (ii) an engaged position in which rotation of the pinion shaft 460 is dependent upon the position of the handle 415. When the pinion shaft 460 is in the free position, rotation of the pinion shaft 460 causes linear displacement of the gear rack and adjustment shaft 450. Similarly, when the pinion shaft 460 is in the engaged position, rotation of the pinion shaft 460 causes linear displacement of the gear rack and adjustment shaft 450. Thus, rotation of the pinion shaft 460 causes linear displacement of the gear rack and adjustment shaft regardless of the pinion shaft being in the free or engaged position. Specifically, FIG. 19 shows the pinion shaft 460 in the engaged position, i.e., position (ii). And, FIG. 20 shows the pinion shaft 460 in the free position, i.e., position (i). The housing bushings 402 continue to support the pinion shaft 460 on the extended cylindrical surfaces. The splines 461 around the entire circumference of the pinion shaft 460, and in the mating bore 417 of the actuation handle 415, allow the pinion shaft 460 to be reinserted to the first axial position when the desired clutch setting position is achieved.

Clutch Removal

Figure 21:
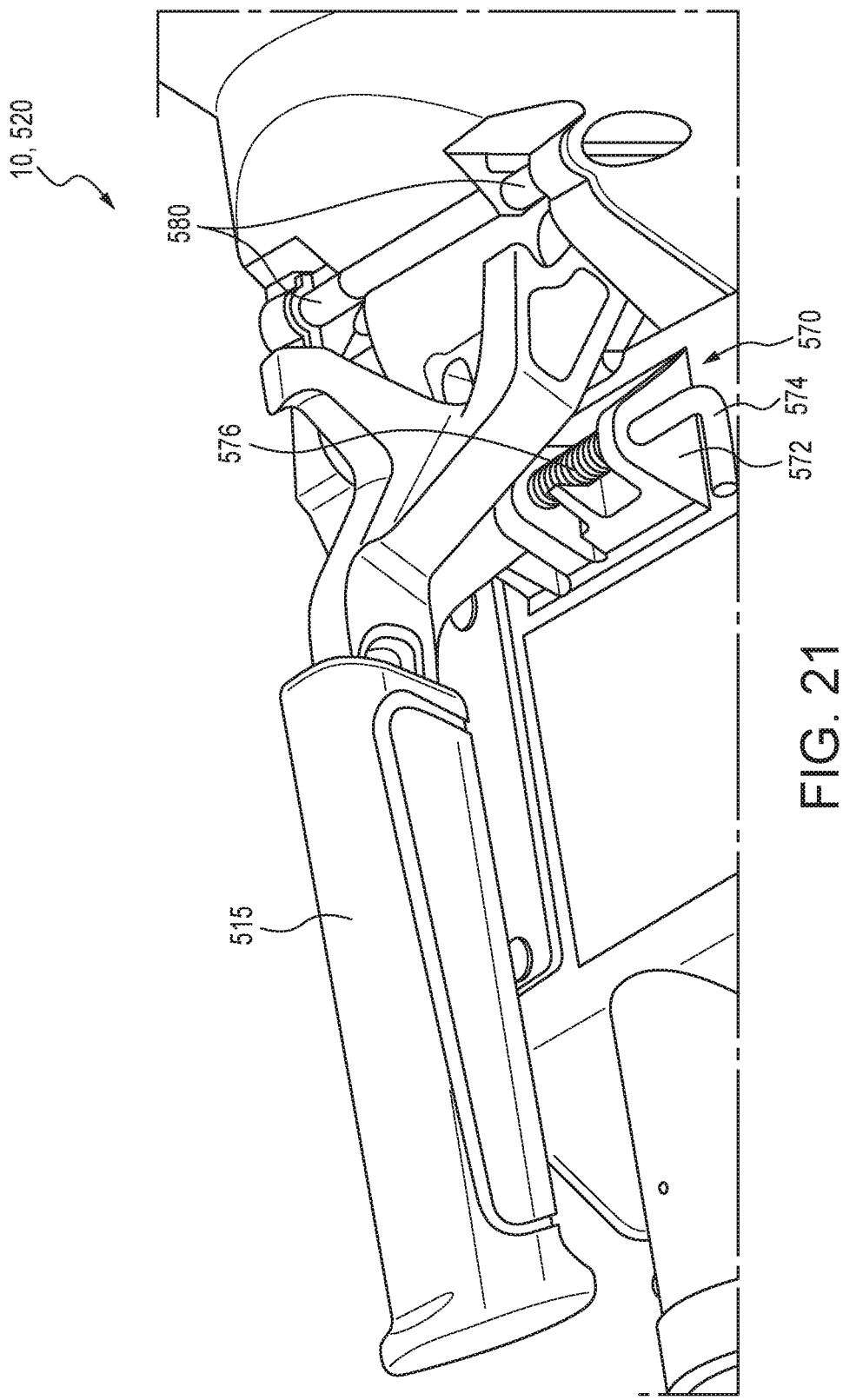
FIGS. 21 to 25 are schematic partial perspective and cross sectional views of a drain cleaning machine utilizing another variant of the embodiment depicted in FIGS. 17-20.
Figure 22:
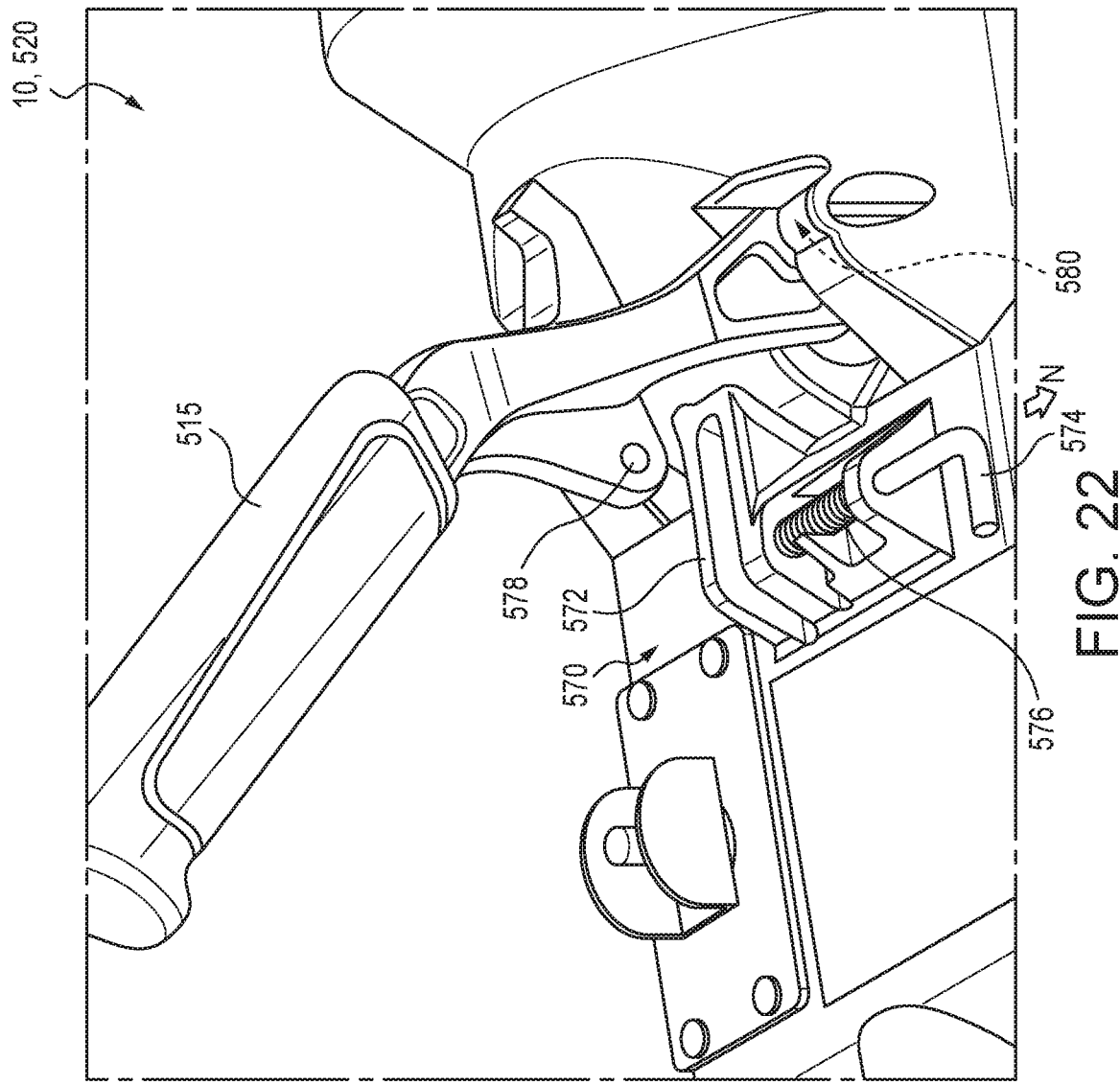
Figure 24:
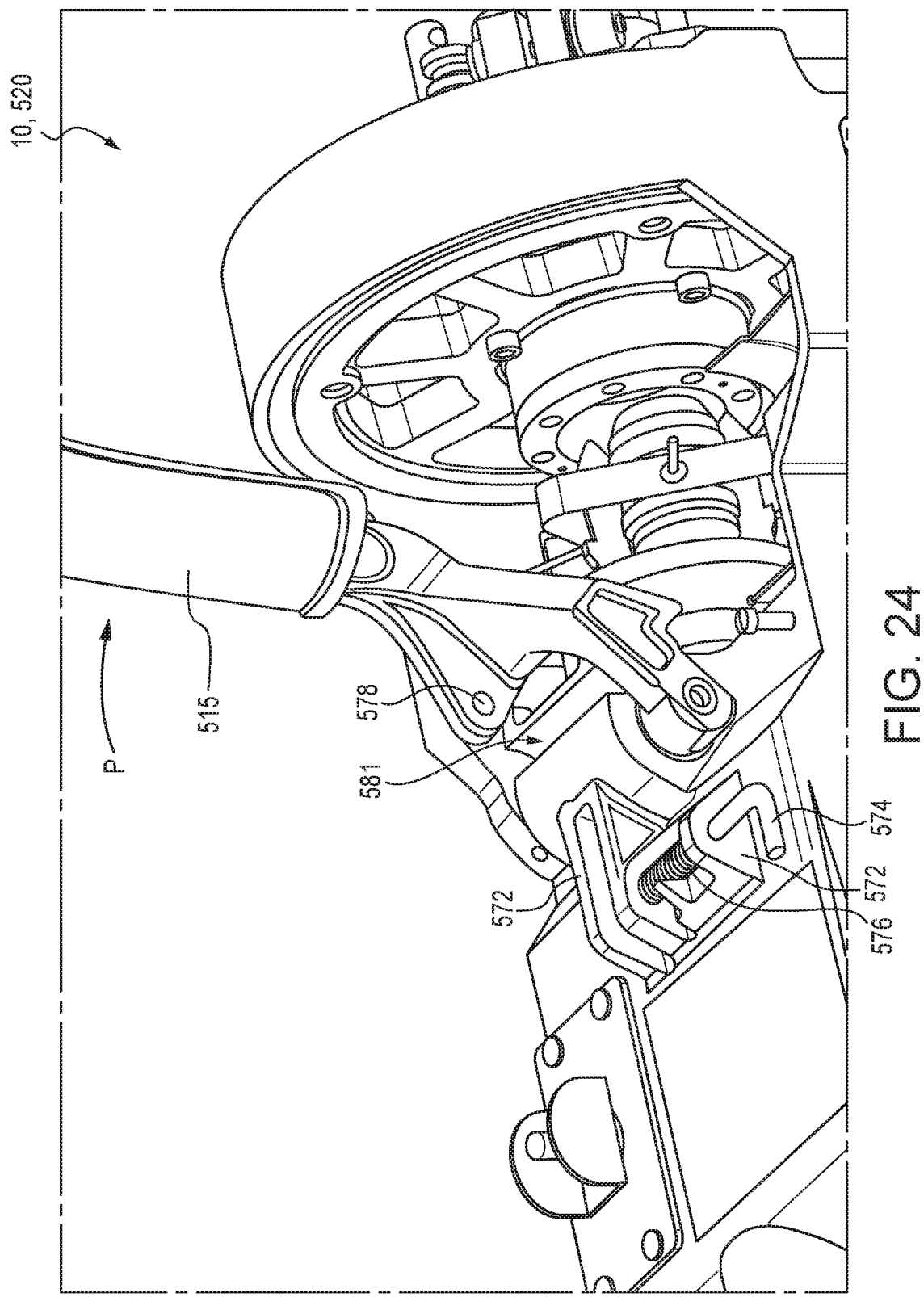
Figure 25:
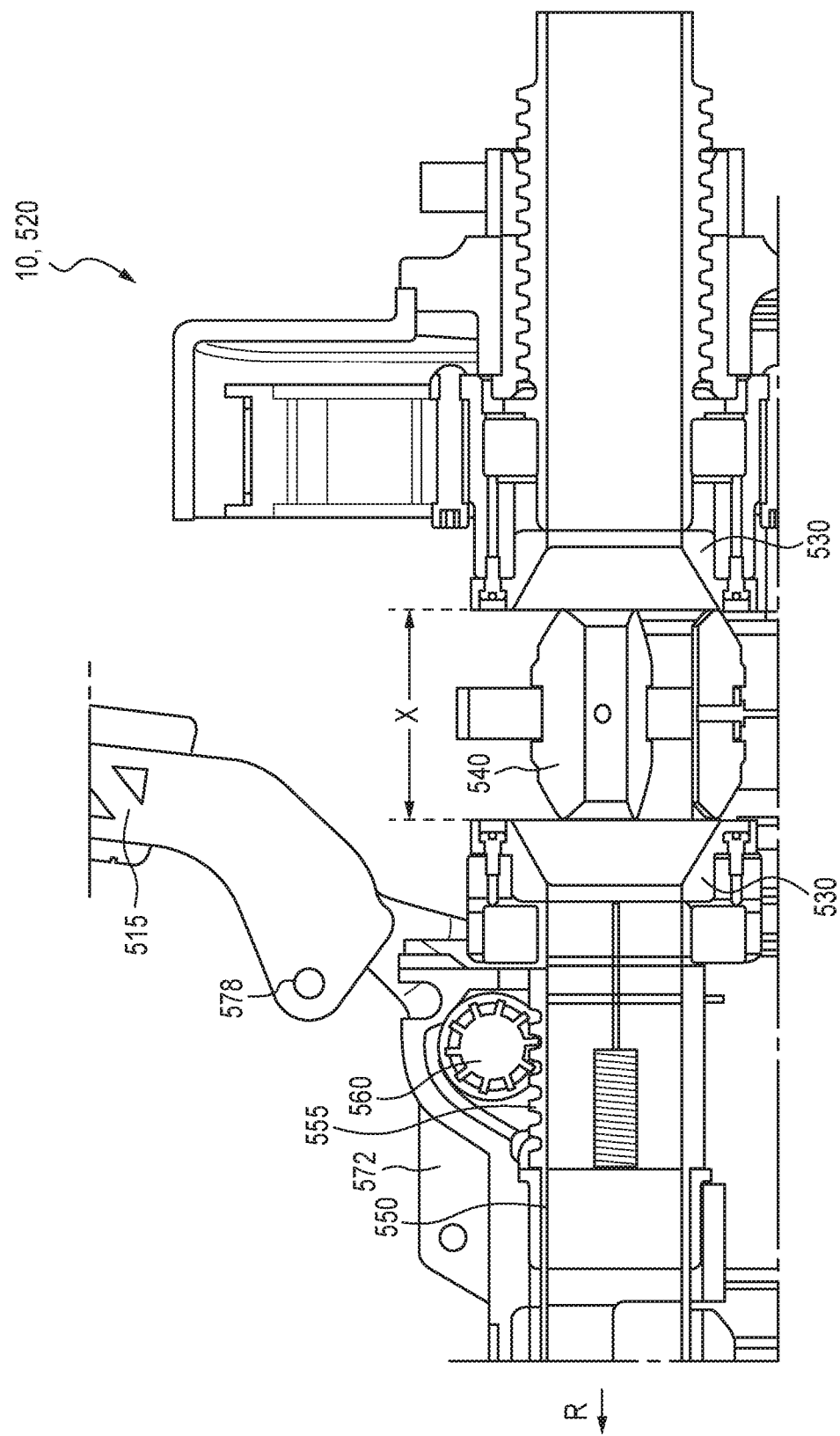

During normal operation, the operator actuation device, for example a clutch actuation handle 515, is moved or otherwise rotated downward to engage the clutch onto the rotating component, for example a drain cleaning cable, as shown in FIG. 21. When the operator removes input from the actuation handle 515, the spring-loaded handle 515 will disengage the clutch from the rotating drain cleaning cable. The position of the actuation handle can be limited by a fixed object, which in this embodiment, can be in the form of a selectively positionable limit pin 580, as shown in FIGS. 21-22. When the adjustment shaft is shifted or linearly displaced furthest away from the actuation handle and the top cover of the machine is removed, the selectively positionable limit pin 580 is also retracted or removed and the actuation handle 515 can then be positioned beyond the normal operating stop. In this case, the clutch system accommodates additional axial linear travel, sufficient to separate the clutch cones to thereby allow the clutch member(s) to be removed from between the clutch cones that typically hold the clutch member(s) in place, as shown in FIG. 24 and FIG. 25.

During clutch replacement, a new clutch or clutch member(s) can be placed in the gap between the clutch cones, and the actuation handle 515 moved or rotated to hold the clutch in position while the top cover is reinstalled. Again, the top cover with the noted limit pin 580 will allow normal operation without loss of the clutch from its operating position.

Specifically, in this embodiment shown in FIGS. 21-25, a drain cleaning machine 10 is provided with an adjustable clutch assembly 520. The clutch assembly 520 comprises the previously described assembly of clutch cones and clutch members. These are shown as clutch members 540 and clutch cones 530. The clutch assembly 520 also comprises a rotatable or movable actuation handle 515. The clutch assembly 520 also comprises a linearly displaceable adjustment shaft 550 having a linear gear rack 555 affixed or formed with the adjustment shaft 550. The adjustment shaft 550 is as the previously described adjustment shaft 450. The clutch assembly 520 additionally comprises a pinion shaft 560 with gear teeth that engage the gear rack 555. Upon rotation of the actuation handle 515, the pinion shaft 560 is rotated, thereby causing linear displacement of the gear rack 555 and the adjustment shaft 550.

The adjustable clutch assembly 520 also comprises a selectively positionable locking pin assembly 570 that includes a base 572, a displaceable pin 574, one or more biasing members 576, and a receiving aperture 578 defined in the actuation handle 515. The aperture 578 is sized and shaped to receive the pin 574. The pin 574 of the pin assembly 570 is positionable between a locked position in which the pin 574 is inserted or disposed in the aperture 578 of the handle 515; and an unlocked position in which the pin 574 is not disposed in the aperture 578, thus allowing the handle 515 to be rotated about the longitudinal axis of the pinion shaft 560. Typically, the pin 574 is moved from the locked position to the unlocked position by pulling or moving the pin 574 in the direction of arrow N in FIG. 22. Upon positioning the pin 574 to the unlocked position, the handle 515 can be freely moved about the axis of the pinion shaft 560. The pin assembly 570 typically also includes one or more biasing members 576 which for example can be in the form of a coil spring. The biasing member(s) 576 are configured to urge the pin 574 toward the unlocked position through contact with a stop pin (not shown). A user can move the pin 574 to the locked position by pushing the pin 570 in a direction opposite of arrow N to thereby compress the biasing member 576, and then turning or rotating the pin 574 about its major axis at which the stop pin (formed or affixed to the pin 574) is received in a portion of the frame or housing of the machine 10 to thereby retain the pin 574 in the locked position.

Referring to FIGS. 22-25, upon positioning the pin 574 to the noted unlocked position, and retracting or removing the limit pin 580, the actuation handle 515 can be further moved in the direction of arrow P, thereby linearly displacing the adjustment shaft 550 in the direction of arrow R. Upon sufficient movement of the adjustment shaft 550, a clearance span X will be achieved, thereby allowing removal of one or more clutch members 540. More specifically, it can be seen from the referenced figures that retraction or removal of the limit pin 580 to create clearance region 581 in FIG. 24, enables the handle 515 to be positioned in the direction of arrow P and thereby allow clutch removal. If the limit pin 580 is not removed to create the clearance region 581 and so the limit pin 580 remains as shown in FIG. 21, the handle 515 can not be positioned to the position shown in FIGS. 24 and 25. Instead, the presence of the limit pin 580 precludes further movement of the handle 515 in the direction of arrow P as shown in FIG. 22.

An advantage of the tool-less clutch adjustment and removal is the efficiency gained by the operator during use. The present subject matter eliminates the need for the user to find a tool that may be misplaced or not available, especially when using the machine on a jobsite. Even if available, accessing and using a tool would cost the user valuable time.

Because the application of the present subject matter is more efficient than currently known techniques and assemblies, operators are more likely to vary drain cleaning cable sizes on jobs, thereby more efficiently and more thoroughly completing the job.

Easily adjusting the clutch, and therefore the actuation device position, means the operator will utilize a more ergonomically-friendly position and optimize the input force they provide to the actuation device.

By easing the means of clutch replacement, better clutch engagement is expected compared to worn components that may traditionally be used beyond recommended life.

In general, the present subject matter could be applied to any application where linear motion is sought via circumferential operator input.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. An adjustable clutch assembly (20) comprising:
a cylindrical sleeve (70) defining a hollow interior aligned with a longitudinal axis (A), wherein at least a portion of the hollow interior of the sleeve (70) includes a circumferential surface defining a threaded region (72);
a plurality of positionable clutch members (40A, 40B) comprising at least one clutch member (40A) defining a first engagement face (42A) and an associated first ramp region (44A), and at least one other clutch member (40B) defining a second engagement face (42B) and an associated second ramp region (44B), wherein the first and second engagement faces (42A, 42B) are spaced apart;
a clutch cone (30) defining a cone face (32) oriented to operatively engage one of the first and second ramp regions (44A, 44B), for positioning one of the clutch members (40A, 40B) toward the other one of the clutch members (40A, 40B);
a cylindrical adjustment member (50) defining a hollow interior (56) aligned with the longitudinal axis (A), wherein an external circumferential surface portion of the cylindrical adjustment member (50) defines a threaded region (58) having threads mating with the threaded region (72) of the cylindrical sleeve (70), wherein rotation of the cylindrical adjustment member (50) in a first direction about the longitudinal axis (A) relative to the sleeve (70) causes the cone face (32) to be urged toward one of the first and second ramp regions (44A, 44B) for operatively positioning the first and second engagement faces (42A, 42B) of the clutch members (40A, 40B) together; and
a locking clamp (85) positionable between a free position at which the cylindrical adjustment member (50) is rotatable about the longitudinal axis (A) relative to the cylindrical sleeve (70) and a locked position at which the cylindrical adjustment member (50) is not rotatable relative to the cylindrical sleeve (70),
wherein the locking clamp (85) includes a circumferential member (80) surrounding at least a portion of the cylindrical adjustment member (50), wherein the circumferential member (80) defines a first end (82) and a second end (84), and wherein the locking clamp (85) further includes a lever mechanism operatively connected to the circumferential member (80) for urging the first end (82) and the second end (84) together and causing the threaded region (72) of the sleeve (70) to frictionally engage the threaded region (58) of the cylindrical adjustment member (50) at a preselected axial position when the locking clamp (85) is at the locked position.

2. The clutch assembly of claim 1, wherein the lever mechanism comprises an over-center lever (90).

3. The clutch assembly of claim 1, wherein further rotation of the cylindrical adjustment member (50) about the longitudinal axis (A) in the first direction, causes the cone face (32) to contact and slidingly engage the other of the first and second ramp regions (44A, 44B) for further positioning the first and second engagement faces (42A, 42B) of the clutch members (40A, 40B) closer together.

4. The clutch assembly of claim 1, wherein further rotation of the adjustment member (50) about the longitudinal axis (A) in the first direction, causes the cone face (32) to contact and slidingly engage both of the first and second ramp regions (44A, 44B) for causing the first and second engagement faces (42A, 42B) to be positioned to operatively contact a drain cleaning cable disposed therebetween.

5. The clutch assembly of claim 1, wherein the sleeve (70) defines at least one circumferential slot (75) through a portion of the sleeve (70).

6. The clutch assembly of claim 5, wherein the sleeve (70) defines at least one axial slot (76) intersecting the at least one circumferential slot (75).

7. The clutch assembly of claim 5, wherein the at least one circumferential slot (75) extends along an arc ranging from about 90° to about 270°.

* * * * *